US005703852A

United States Patent [19]
Kumagai

[11] Patent Number: 5,703,852
[45] Date of Patent: Dec. 30, 1997

[54] OPTICAL DISK REPRODUCING APPARATUS HAVING A COSINE EQUALIZER WITH BOOSTED FREQUENCY CHARACTERISTICS

[75] Inventor: Eiji Kumagai, Kanagawa, Japan

[73] Assignee: Sony Corporation, Tokyo, Japan

[21] Appl. No.: 627,139

[22] Filed: Apr. 3, 1996

[30] Foreign Application Priority Data

Apr. 6, 1995 [JP] Japan .................................. 7-081444

[51] Int. Cl.$^6$ .................. G11B 5/09; G11B 5/02; G11B 5/035
[52] U.S. Cl. .................. 369/48; 360/27; 360/65
[58] Field of Search .................. 369/54, 58, 47, 369/48, 50, 59, 124, 53; 360/25, 27, 65, 29, 30

[56] References Cited

U.S. PATENT DOCUMENTS

| | | | |
|---|---|---|---|
| 4,509,155 | 4/1985 | Masuda et al. | 369/48 |
| 4,616,356 | 10/1986 | Wilkinson et al. | 369/124 X |
| 4,780,772 | 10/1988 | Shibuya et al. | 369/59 X |
| 5,388,087 | 2/1995 | Saiki et al. | 369/48 |

FOREIGN PATENT DOCUMENTS

| | | | |
|---|---|---|---|
| 62-135009 | 6/1987 | Japan | H03H 15/00 |
| 63-37789 | 2/1988 | Japan | H04N 5/92 |
| 5-342588 | 12/1993 | Japan | G11B 7/00 |
| 6-164317 | 6/1994 | Japan | H03H 17/00 |
| 6-203382 | 7/1994 | Japan | G11B 7/00 |

*Primary Examiner*—P. W. Huber
*Attorney, Agent, or Firm*—Limbach & Limbach L.L.P.

[57] ABSTRACT

An optical disk apparatus has an optical pickup, a cosine equalizer having frequency characteristics including a boosting frequency for a frequency component which has a frequency that is about twice the frequency of an RF signal reproduced from recorded data with a shortest data length, and a digital signal processor for generating recorded data from the RF signal. Irrespective to the type of reproduced data from the optical pickup, the optical disk apparatus greatly increases the quality of the reproduced data as information transfer accuracy as compared with a conventional disk optical system.

7 Claims, 18 Drawing Sheets

FIG. 6 (PRIOR ART)

| Disk Type | Number of Errors Per Block | |
|---|---|---|
| | Normal Speed | Double Speed |
| CD-ROM of Standard Quality | 6 ~ 20 | 6 ~ 20 |
| CD-R | 3 ~ 35 | 45 ~ 104 |
| CD-ROM of Quality Lower Than Standard Quality | 222 ~ 305 | 318 ~ 410 |

FIG. 10A

| Mode | Mode Indicating Data | Coefficient | Delay Time |
|---|---|---|---|
| | | Data Which May Not be Contained in Table Data | |
| Normal Speed | 0 1 | K1 | DL1 |
| Double Speed | 1 0 | K2 | DL2 |
| Fourfold Speed | 1 1 | K4 | DL4 |

FIG. 10B

| Mode Indicating Data | Switch for Coefficient | Switch for Delay Valve |
|---|---|---|
| 0 1 | a | a |
| 1 0 | b | b |
| 1 1 | c | c |

FIG. 18

| Disk Type | Number of Errors Per Block | | |
|---|---|---|---|
| | Normal Speed | Double Speed | Fourfold Speed |
| CD-ROM Standard Quality | 0~11 | 0~17 | 1~17 |
| CD-R | 5~13 | 6~20 | 13~23 |
| CD-ROM of Quality Lower Than Standard Quality | 31~74 | 29~71 | 46~90 |

OPTICAL DISK REPRODUCING APPARATUS HAVING A COSINE EQUALIZER WITH BOOSTED FREQUENCY CHARACTERISTICS

BACKGROUND OF THE INVENTION

1. Field of the Invention

The present invention relates to an optical disk apparatus suitable for use as an optical disk system comprising an optical disk drive and a host computer.

2. Description of the Related Art

One conventional optical disk system comprising an optical disk drive and a host computer is shown in FIG. 1 of the accompanying drawings.

As shown in FIG. 1, the optical disk system comprises an optical disk drive and a host computer 18 which is connected to the optical disk drive through a host interface 14 and a SCSI (Small Computer Systems Interface) bus 17 which belong to the optical disk drive.

The optical disk drive has a CPU 1 connected to a bus 2, a work RAM 3 connected to the bus 2, a ROM 4 connected to the bus 2 for storing program data 4a for system control and parameter data 4b for control, a servo system signal processor 5 connected to the bus 2, a spindle motor 6 connected to the bus 2 through the servo system signal processor 5, for rotating an optical disk 7, and an optical pickup 8 connected to the bus 2. The optical disk drive also includes an input/output port 10 connected to the bus 2, an equalizer 11 connected to the input/output port 10 for equalizing the waveform of an RF signal from a playback amplifier 9 connected to the optical pickup 8, a digital signal processor 12 connected to the input/output port 10 for converting an output signal from the equalizer into a binary signal, thereafter reproducing a clock signal, reproducing data based on the clock signal, and effecting a CIRC error-correcting process on the reproduced data, a decoder 13 connected to the input/output port 10 for decoding the processed data from the digital signal processor 12 into original data, and a host interface 14 connected to the input/output port 10 for communication with the host computer 18.

The servo system signal processor 5 serves to energize the spindle motor 6 and effect focusing and tracking control on the optical pickup 8 for controlling a thread feed motor (not shown). When the optical disk system is turned on, the program data 4a stored in the ROM 4 are loaded into a main memory of the CPU 1, which then functions as a RAM control means 15 and a system control means 16 as indicated by the dotted lines. The optical disk 7 which can be used in the optical disk system may be a CD-ROM, a CD-DA (digital audio), a CD-R (recordable), or the like. The optical disk system may play back the optical disk 7 at a normal speed or a double speed based on a command from the host computer 18. The optical disk 7 contains recorded data which have a shortest data length (shortest pit length) and a longest data length (longest pit length) set to 3 T, 11 T, respectively, and are modulated by a DC-free EFM (Eight to Fourteen Modulation) process.

The equalizer 11 serves to compensate for a degradation of the eye pattern according to the MTF (Modulation Transfer Function). As well known in the art, when the optical disk 7 is played back, due to certain conditions in which the optical disk 7 has been produced, the slope of the impulse response waveform of an output signal from the optical pickup 8 becomes smoother, and the center of the eye pattern is blurred or disturbed, with the result that the output signal from the optical pickup 8 cannot stably be converted into a binary signal on the basis of the center of the eye pattern. To avoid such a drawback, the equalizer 11 lifts the level to a high frequency range for stable binary signal conversion, so that a degradation of the MTF can equivalently be compensated for.

The optical disk system shown in FIG. 1 operates as follows: When the optical disk 7 is loaded into the optical disk drive, the spindle motor 6 is rotated to rotate the optical disk 7 at a constant linear velocity. When the rotational speed of the optical disk 7 becomes constant, the optical pickup 8 reads recorded data from the optical disk 7, and the read data are supplied as a reproduced RF signal through the playback amplifier 9 and the equalizer 11 to the digital signal processor 12, which reproduces the RF signal as digital data. The digital data are supplied to the decoder 13, which effects an error-correcting processing the supplied digital data to generate original data. At this time, the decoder 13 detects a control bit representing the information which is indicative of whether the optical disk 7 is a CD-DA or a CD-ROM, and the detected control bit is supplied as disk information data through the host interface 14 and the SCSI bus 17 to the host computer 18.

Based on the disk information data supplied from the optical disk drive through the SCSI bus 17, the host computer 18 determines whether the optical disk 7 is a CD-DA or a CD-ROM. The host computer 18 then supplies speed command data based on the determined result through the SCSI bus 17 to the optical disk drive. Specifically, if the optical disk 7 is a CD-DA, then the host computer 18 supplies speed command data indicating that the optical disk 7 be played back at the normal speed to the optical disk drive. If the optical disk 7 is a CD-ROM, then the host computer 18 supplies speed command data indicating that the optical disk 7 be played back at the double speed to the optical disk drive.

When the speed command data are supplied from the host computer 18 to the optical disk drive, the system control means 16 supplies a control signal representative of a playback speed to the servo system signal processor 5. The servo system signal processor 5 energizes the spindle motor 6 to rotate at a rotational speed corresponding to the playback speed. The data recorded on the optical disk 7 are now reproduced at the speed based on the speed command data from the host computer 18.

FIG. 2 of the accompanying drawings shows an internal circuit arrangement of the equalizer 11 shown in FIG. 1. The equalizer 11 shown in FIG. 2 is generally referred to as a T-type equalizer.

As shown in FIG. 2, the equalizer 11 has an input terminal 11a which is supplied with the reproduced RF signal from the playback amplifier 9 shown in FIG. 1. The input terminal 11a is connected through a resistor 11b to an inverting input terminal (−) of an operational amplifier 11c. A reference voltage source (not shown) is connected through a resistor 11d to a noninverting input terminal (+) of the operational amplifier 11c. The operational amplifier 11c has an output terminal connected to an output terminal 11e of the equalizer 11 which is connected to an input terminal of the digital signal processor 12 shown in FIG. 1. The output terminal of the operational amplifier 11c is also connected to ground through a series-connected circuit of resistors 11f, 11g and a capacitor 11h. The noninverting input terminal (+) of the operational amplifier 11c is connected through a resistor 11i to a junction between the resistors 11f, 11g.

The resistors 11b, 11d, 11i have respective resistances of 1 KΩ, the resistor 11f has a resistance of 1.5 KΩ, and the resistor 11g has a resistance of 470 Ω. The capacitor 11h has a capacitance of 56 PF.

The equalizer 11 shown in FIG. 2 operates as follows: The reproduced RF signal from the playback amplifier 9 shown in FIG. 1 is supplied through the input terminal 11a to the inverting input terminal (−) of the operational amplifier 11c. The equalizer 11 presents a lower impedance to a higher-frequency signal and a higher impedance to a lower-frequency signal because of a time-constant circuit which comprises the resistor 11g and the capacitor 11h. Specifically, a lower-frequency signal is fed back with a larger intensity to the inverting input terminal (−) of the operational amplifier 11c through the resistors 11f, 11i, and is not boosted because the gain of the operational amplifier 11c is lowered. On the other hand, a higher-frequency signal is fed back with a smaller intensity to the inverting input terminal (−) of the operational amplifier 11c through the resistors 11f, 11i, 11g, and is boosted because the gain of the operational amplifier 11c is increased. Accordingly, only a high-frequency component of the reproduced RF signal is boosted.

When an optical disk is manufactured, the ratio of the length of recesses or pits to the length of lands that are paired with the pits is not constant. Stated otherwise, pits whose lengths are larger and smaller than desirable pits are formed on an optical disk, a phenomenon called asymmetry. It is impossible to produce pits at a duty cycle of 50% owing to various limitations posed by the manufacturing process. The asymmetry results in periodic variations in the reproduced signal from the optical disk.

Peak shifts of the output signal from the equalizer 11 shown in FIG. 2, i.e., the proportion of periodic variations introduced in the reproduced RF signal due to asymmetry on the optical disk, to the desirable period of the reproduced RF signal, are shown in FIG. 3 of the accompanying drawings.

FIG. 3 is a graph showing the proportion of periodic variations in the reproduced RF signal outputted from the equalizer 11 to the desirable period of the reproduced RF signal. The vertical axis of the graph represents the proportion (%) of periodic variations to the desirable period, and the horizontal axis represents patterns (3 T~11 T). In the graph, the mark "■" indicates the proportion of peak shifts of an output signal (which is of a low level because there is an interference of light) representing lands on the optical disk, and the mark "58" indicates the proportion of peak shifts of an output signal (which is of a high level because there is no interference of light) representing pits associated with lands on the optical disk.

The proportion of positive peak shifts and the proportion of negative peak shifts at the same period should ideally be equal to each other. As can be seen from FIG. 3, however, they are different from each other on account of the asymmetry on the optical disk.

FIG. 4 of the accompanying drawings shows the ideal waveforms of RF signals reproduced from an optical disk. The vertical axis of FIG. 4 represents the amplitude, and the horizontal axis thereof represents the time. As can be understood from FIG. 4, the waveforms of the patterns 3 T~11 T are regular and have a constant positional relationship with respect to each other.

FIG. 5 of the accompanying drawings shows the waveforms of RF signals outputted from the equalizer 11 shown in FIG. 2. As shown in FIG. 5, the waveforms of the patterns 3 T, 4 T remain unchanged because they are composed of fundamentals. Since, however, the time-constant circuit of the capacitor 11h and the resistor 11g is used to raise the high-frequency level, as described above with reference to FIG. 2, a higher-frequency component of an RF signal supplied to the equalizer 11 is outputted with a delay time depending on its frequency as compared with a lower-frequency component thereof. Therefore, as shown in FIG. 5, the waveforms of the patterns 5 T~11 T which contain harmonics are distorted, resulting in waveform variations in the time domain. When the distorted waveforms are converted into binary waveforms, the waveform variations in the time domain are introduced into the binary waveforms.

A specific example of error rates of different optical disks will be described below with reference to FIG. 6 of the accompanying drawings. FIG. 6 shows the numbers of errors produced per block when three different types of optical disks are played back by the optical disk system shown in FIG. 1. Errors produced per block are counted by an error counter which is connected to the digital signal processor 12 shown in FIG. 1 when it effects an error-correcting process on the output signal from the equalizer 11. The numbers of errors shown in FIG. 6 are expressed in bytes. For example, if the number of errors is "1", then it means that one byte of errors is produced.

The term "standard quality" used herein signifies the average number of errors per block which is calculated by obtaining average numbers of errors per block that are generated when optical disks manufactured by respective manufacturers are played back and averaging the average numbers of errors per block thus obtained. The term "quality lower than standard quality" used herein means that the average number of errors per block that are generated when an optical disk manufactured by a manufacturer is played back is greater than the above calculated average number of errors per block.

As shown in FIG. 6, the number of errors per block which are generated when a "CD-ROM of standard quality" is played back is in the range from 6 to 20 at a normal speed and in the range from 6 to 20 at a double speed. The number of errors per block which are generated when a "CD-R" is played back is in the range from 3 to 35 at a normal speed and in the range from 45 to 104 at a double speed. The number of errors per block which are generated when a "CD-ROM of quality lower than standard quality" is played back is in the range from 222 to 306 at a normal speed and in the range from 318 to 410 at a double speed.

As can be understood from the above numerical values, the number of errors per block which are generated when a CD-ROM of quality lower than standard quality is played back is 37 to 51 times (at a normal speed) or 53 to 68.8 times the number of errors per block which are generated when a CD-ROM of standard quality is played back. Therefore, many data which cannot be error-corrected are generated when such a CD-ROM of quality lower than standard quality is played back. Such a CD-ROM is a "CD-ROM of quality lower than standard quality", but not a defective CD-ROM, and is available in the market as a normal product.

SUMMARY OF THE INVENTION

It is therefore an object of the present invention to provide an optical disk apparatus which is capable of producing a good reproduced output signal from a CD-ROM of quality lower than standard quality by reducing the number of errors per block thereby to reduce the number of errors that cannot be corrected.

According to the present invention, there is provided an optical disk apparatus comprising an optical pickup for reproducing an RF signal from an optical recording medium on which data modulated by a modulation process with a prescribed shortest data length are recorded, a cosine equalizer having frequency characteristics including a boosting frequency for a frequency component which has a frequency that is about twice the frequency of the RF signal reproduced from the recorded data with the shortest data length, for thereby equalizing a waveform of the RF signal, and recorded data generating means connected to the cosine equalizer for generating the recorded data from the RF signal.

With the above arrangement, the optical pickup reproduces an RF signal from the optical recording medium on which data modulated by the modulation process with the prescribed shortest data length are recorded, and the cosine equalizer boosts a frequency component of the RF signal, which has a frequency that is about twice the frequency of the RF signal reproduced from the recorded data with the shortest data length. The recorded data generating means then generates the recorded data from an output signal from the cosine equalizer.

BRIEF DESCRIPTION OF THE DRAWINGS

FIG. 6 is a diagram showing error rates produced depending on disk types and playback speeds in the conventional optical disk system shown in FIG. 1;

FIG. 10A is a diagram showing an equalizer characteristics switching table;

FIG. 10B is a diagram showing a switch control table;

FIG. 18 is a diagram showing error rates produced depending on disk types and playback speeds in the optical disk apparatus shown in FIG. 7.

DETAILED DESCRIPTION OF THE PREFERRED EMBODIMENT

Figure 1:
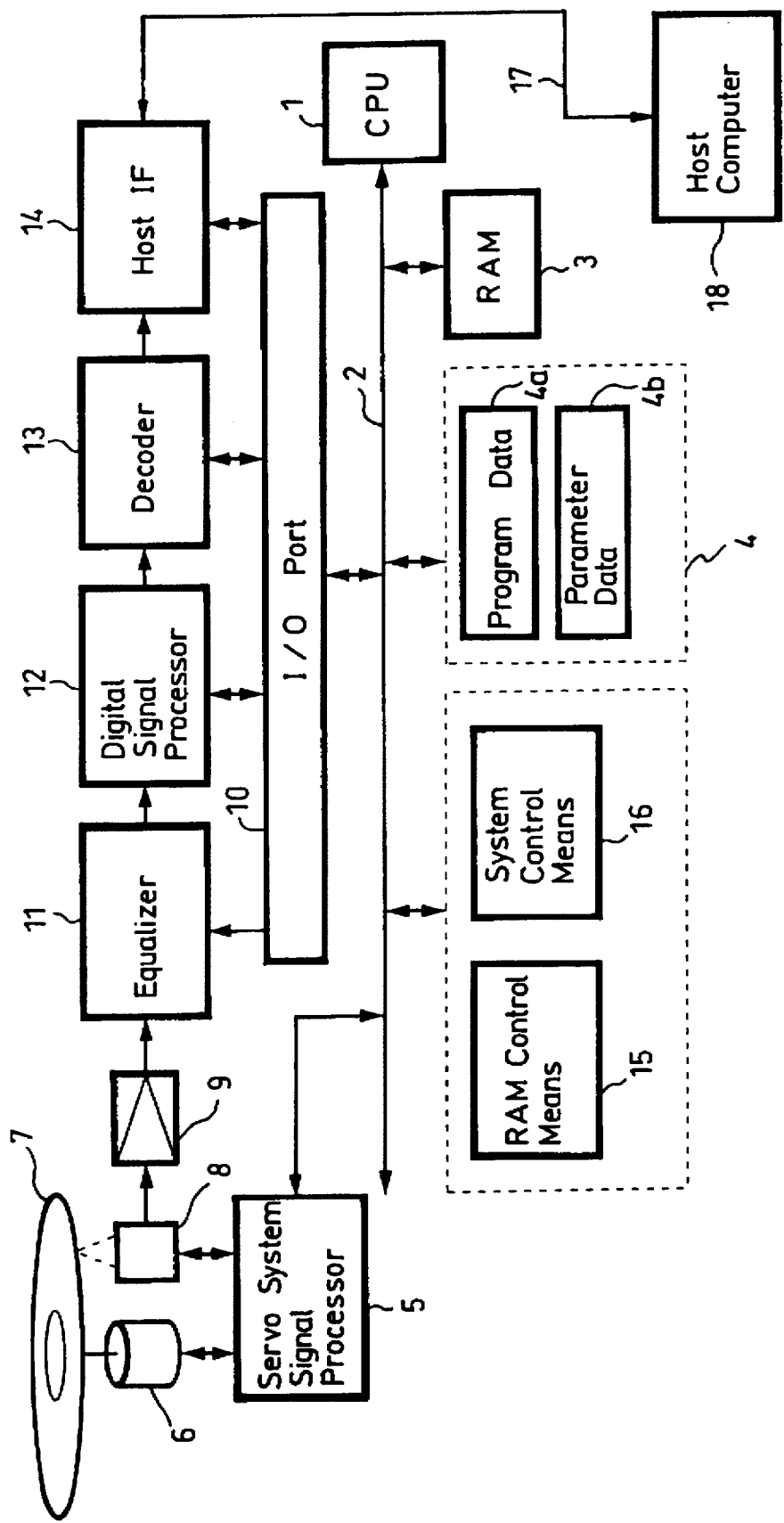
FIG. 1 is a block diagram of a conventional optical disk system.
Figure 2:
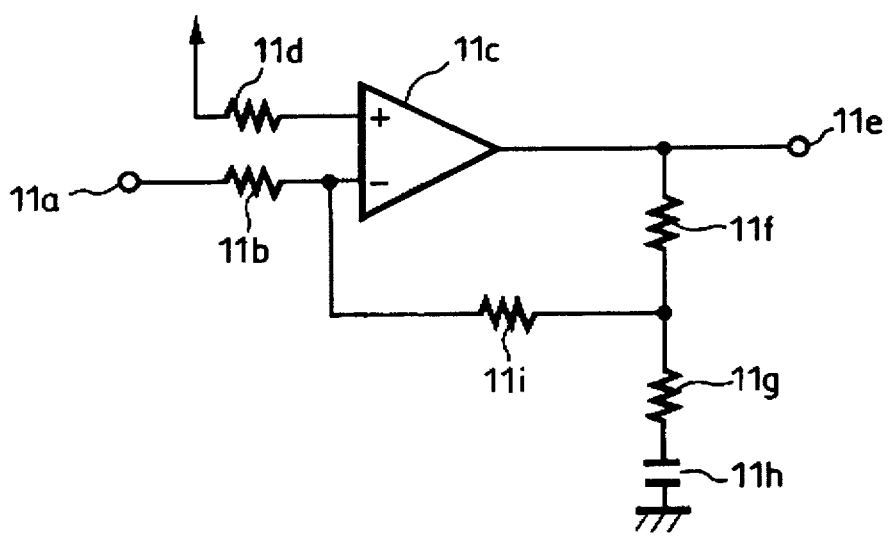
FIG. 2 is a circuit diagram showing an internal arrangement of an equalizer in the conventional optical disk system shown in FIG. 1.
Figure 3:
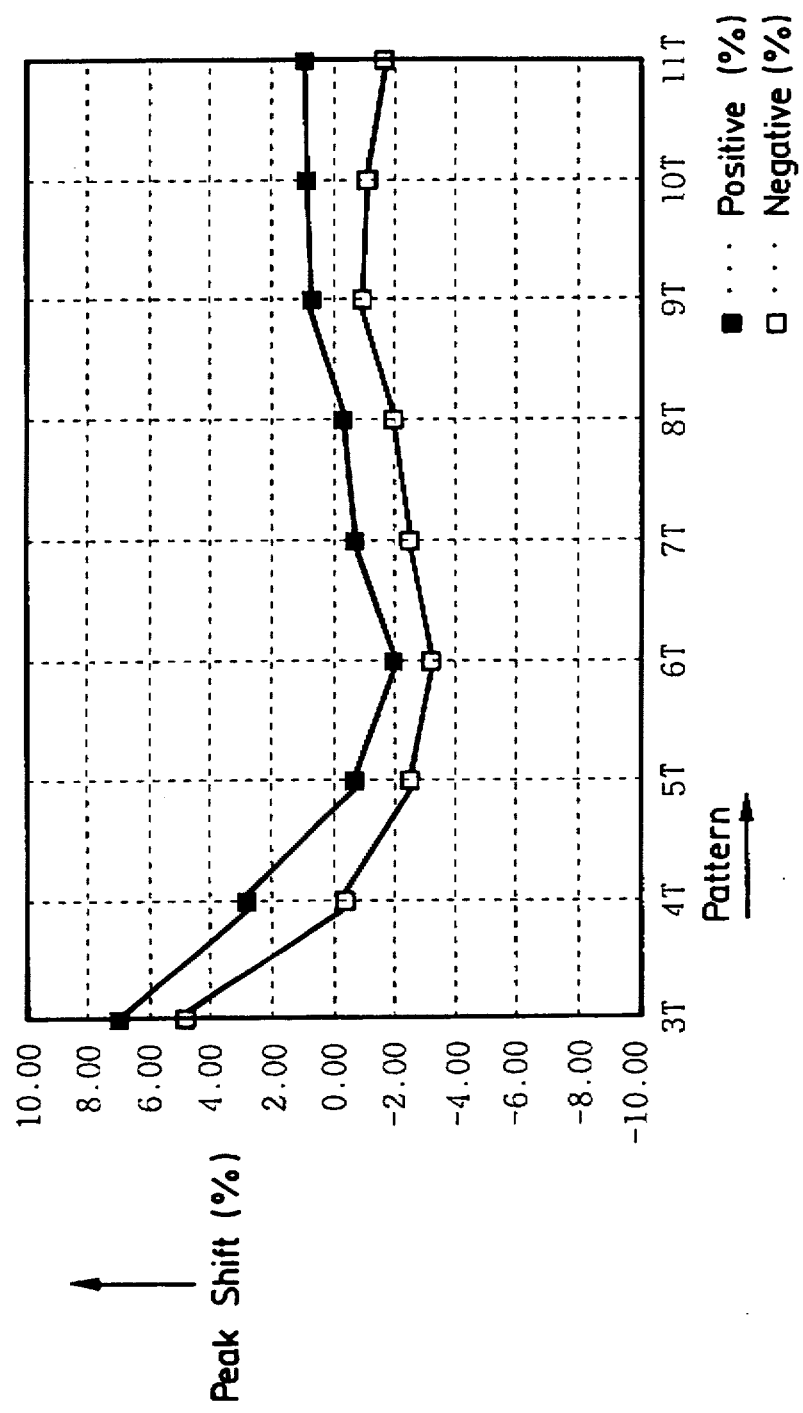
FIG. 3 is a graph illustrative of peak shifts of an output signal from the equalizer in the conventional optical disk system shown in FIG. 1.
Figure 4:
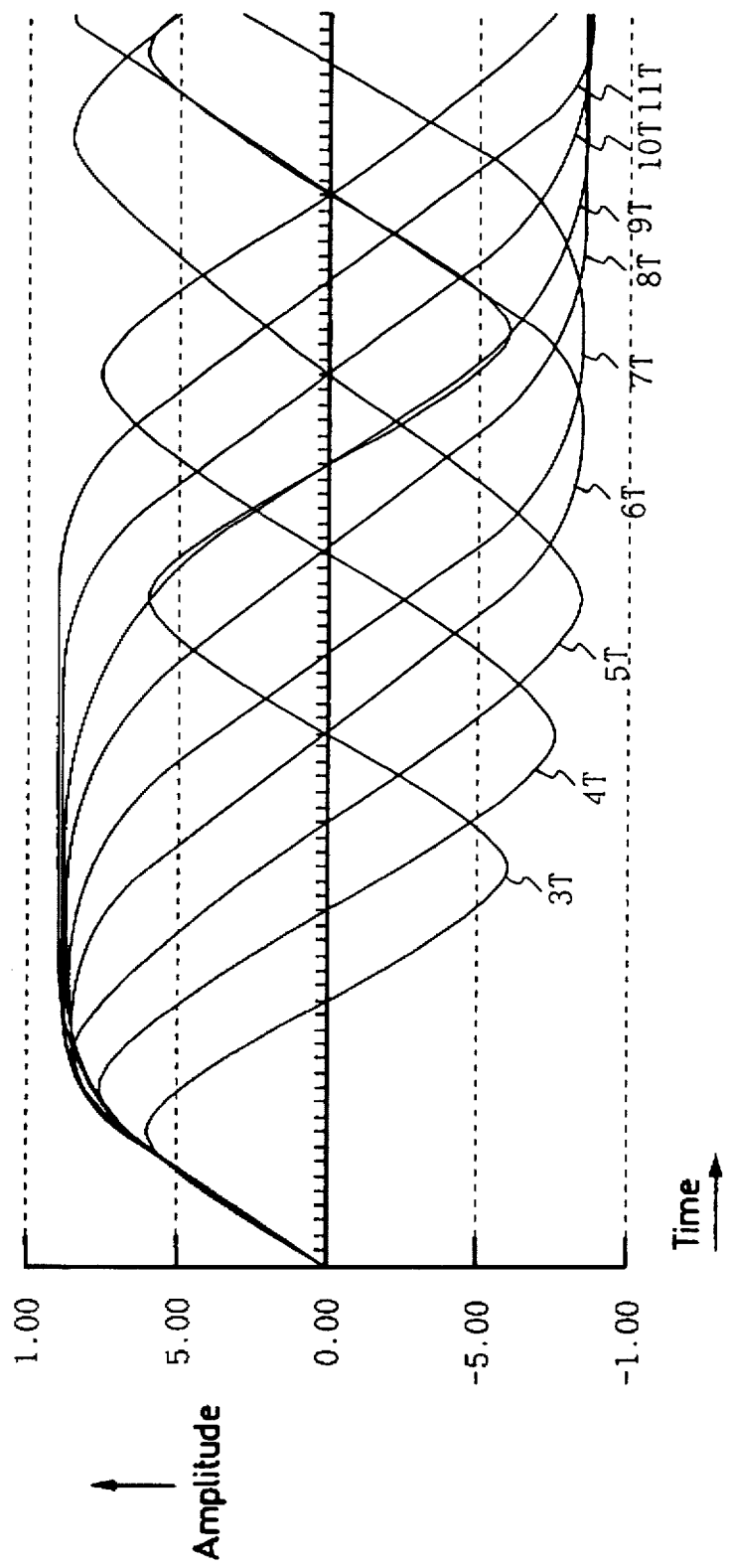
FIG. 4 is a diagram showing the waveforms of RF signals, containing no group delays, reproduced from an optical disk.
Figure 5:
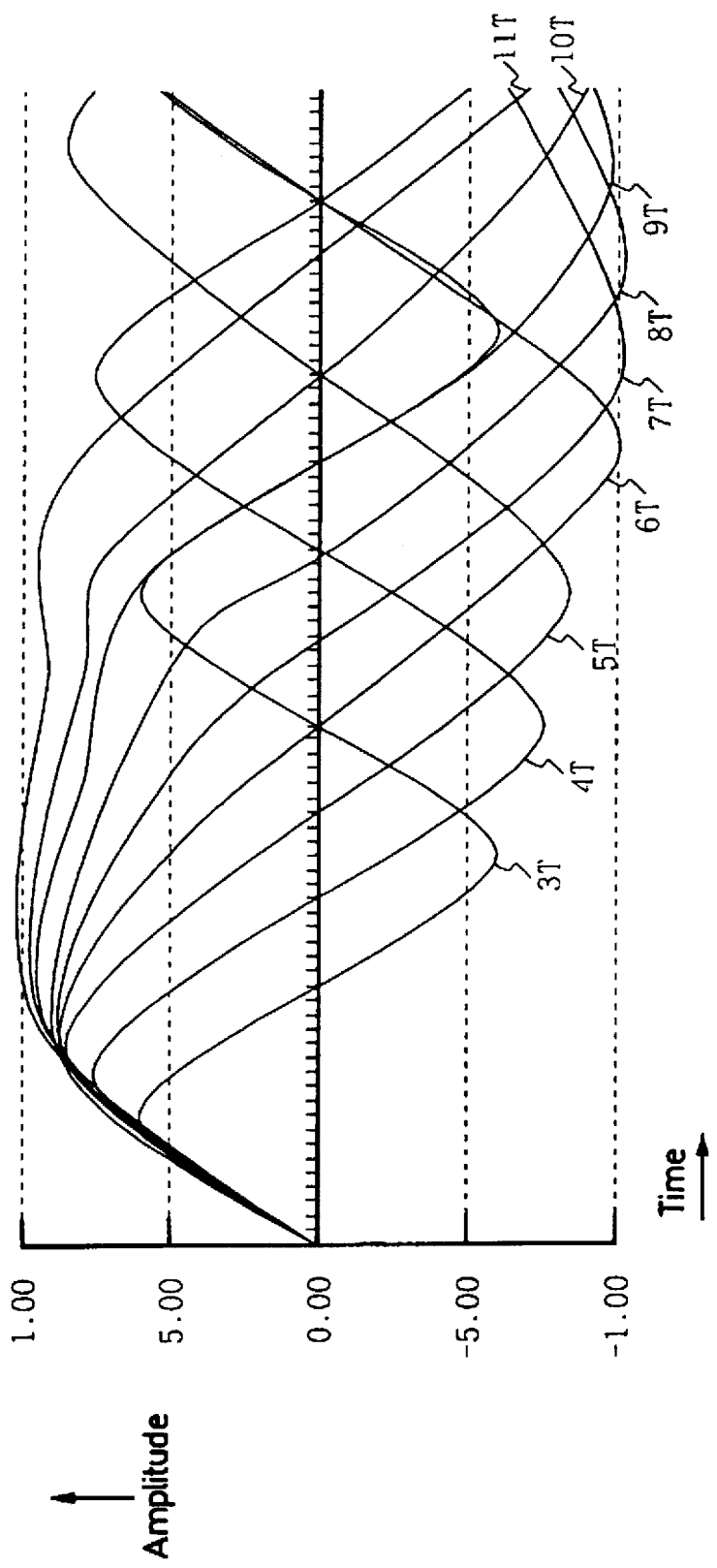
FIG. 5 is a diagram showing the waveforms of RF signals, containing group delays, outputted from the equalizer in the conventional optical disk system shown in FIG. 1.
Figure 7:
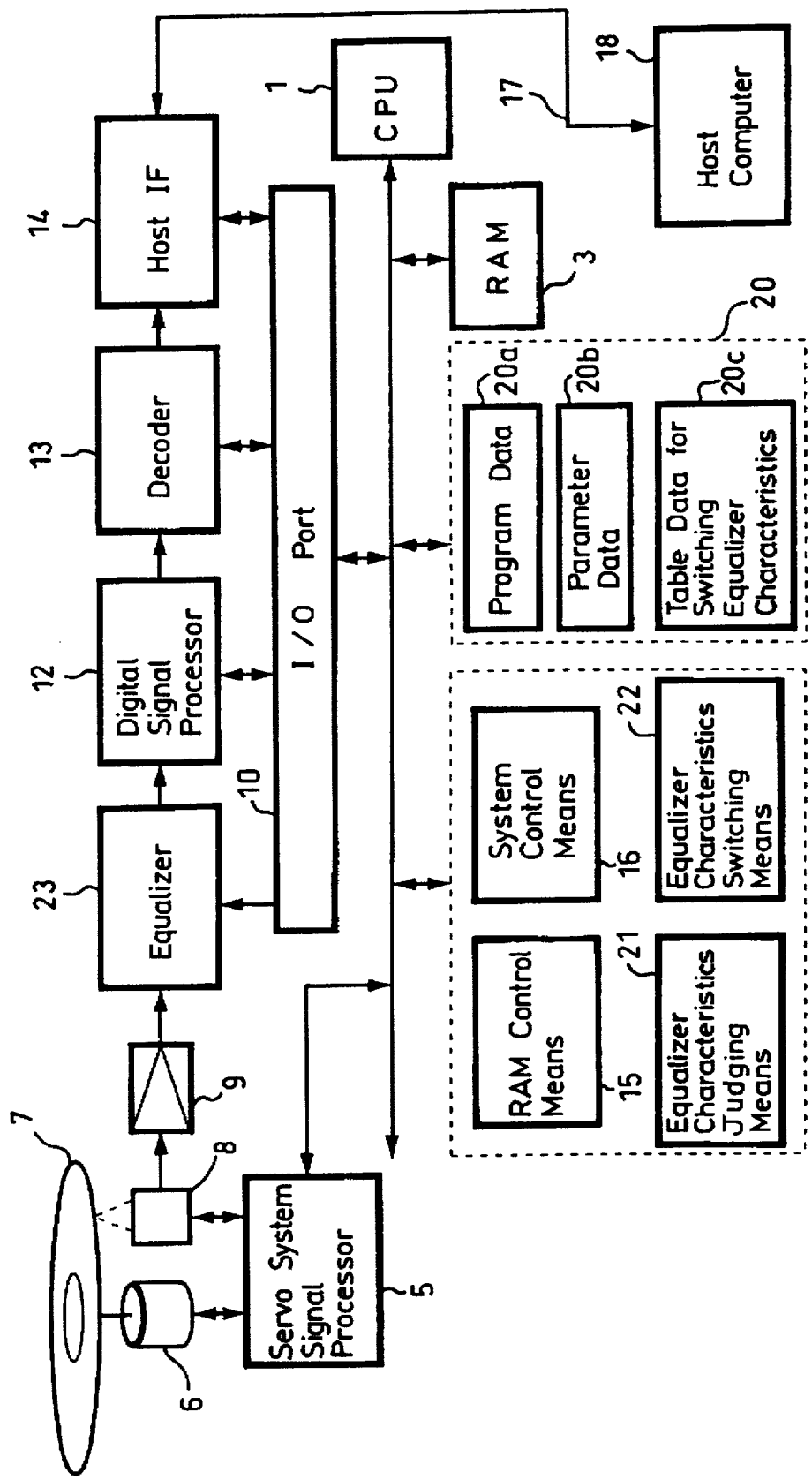
FIG. 7 is a block diagram of an optical disk apparatus according to the present invention.

FIG. 7 shows an optical disk apparatus according to the present invention, the optical disk apparatus being embodied as an optical disk system which comprises an optical disk drive and a host computer. Those parts of the optical disk system shown in FIG. 7 which are identical to those of the conventional optical disk system shown in FIG. 1 are denoted by identical reference numerals, and will not be described in detail below.

As shown in FIG. 7, a ROM 20 which stores program data 20a for system control, parameter data 20b representing various parameters for control, and table data 20c for switching equalizer characteristics is connected to the bus 2. When the optical disk system is turned on, the program data 20a stored in the ROM 20 are loaded into a main memory of the CPU 1, which then functions as a RAM control means 15 and a system control means 16 as described above with reference to FIG. 1, and also functions as an equalizer characteristics judging means 21 for judging the characteristics of an equalizer 23, and an equalizer characteristics switching means 22 for switching the characteristics of the equalizer 23.

When speed command data are supplied from the host computer 18, the equalizer characteristics judging means 21 judges corresponding equalizer characteristics from the equalizer characteristic switching table data 20c. The equalizer characteristics switching means 22 switches the characteristics of the equalizer 23 based on the judged result from the equalizer characteristics judging means 21 and the contents of the equalizer characteristic switching table data 20c. The equalizer 23 switches its own characteristics under the control of the equalizer characteristics switching means 22, and equalizes the waveform of an RF signal outputted from the playback amplifier 9.

Operation of the optical disk system shown in FIG. 7 will be described below. When the optical disk 7 is loaded into the optical disk drive, the spindle motor 6 is rotated to rotate the optical disk 7 at a constant linear velocity. The optical disk 7 contains recorded data which have been modulated by EFM. When the rotational speed of the optical disk 7 becomes constant, the optical pickup 8 reads recorded data from the optical disk 7, and the read data are supplied as a reproduced RF signal through the playback amplifier 9 and the equalizer 23 to the digital signal processor 12, which reproduces the RF signal as digital data. The digital data are supplied to the decoder 13, which effects an error-correcting processing of the supplied digital data to generate original data. At this time, the decoder 13 detects a control bit representing the information which is indicative of whether the optical disk 7 is a CD-DA or a CD-ROM, and the detected control bit is supplied as disk information data through the host interface 14 and the SCSI bus 17 to the host computer 18.

Based on the disk information data supplied from the optical disk drive through the SCSI bus 17, the host computer 18 displays information indicative of whether the optical disk 7 loaded in the optical disk drive is a CD-DA or a CD-ROM, as an image on a television monitor (not shown), and waits for a key input signal from a keyboard (not shown). Now, the operator operates the keyboard to indicate a normal-speed playback mode, a double-speed playback mode, or a fourfold-speed playback mode to the host computer 18, which then supplies speed command data based on the indicated playback mode through the SCSI bus 17 to the optical disk drive.

When the speed command data are supplied from the host computer 18 to the optical disk drive, the system control means 16 supplies a control signal representative of a playback speed to the servo system signal processor 5. The servo system signal processor 5 energizes the spindle motor 6 to rotate at a rotational speed corresponding to the playback speed. The data recorded on the optical disk 7 are now reproduced at the speed based on the speed command data from the host computer 18.

The equalizer characteristics judging means 21 refers to the equalizer characteristic switching table data 20c to determine control data corresponding to a speed which is indicated by the speed command data from the host computer 18. The equalizer characteristics switching means 22 supplies the control data determined by the equalizer characteristics judging means 21 through the input/output port 10 to the equalizer 23. Based on the control data from the equalizer characteristics switching means 22, the equalizer 23 switches its own characteristics. Therefore, the RF signal reproduced from the optical disk 7 by the optical pickup 8 and amplified by the playback amplifier 9 is equalized in waveform with the characteristics most suitable for the playback speed by the equalizer 23.

Figure 8:
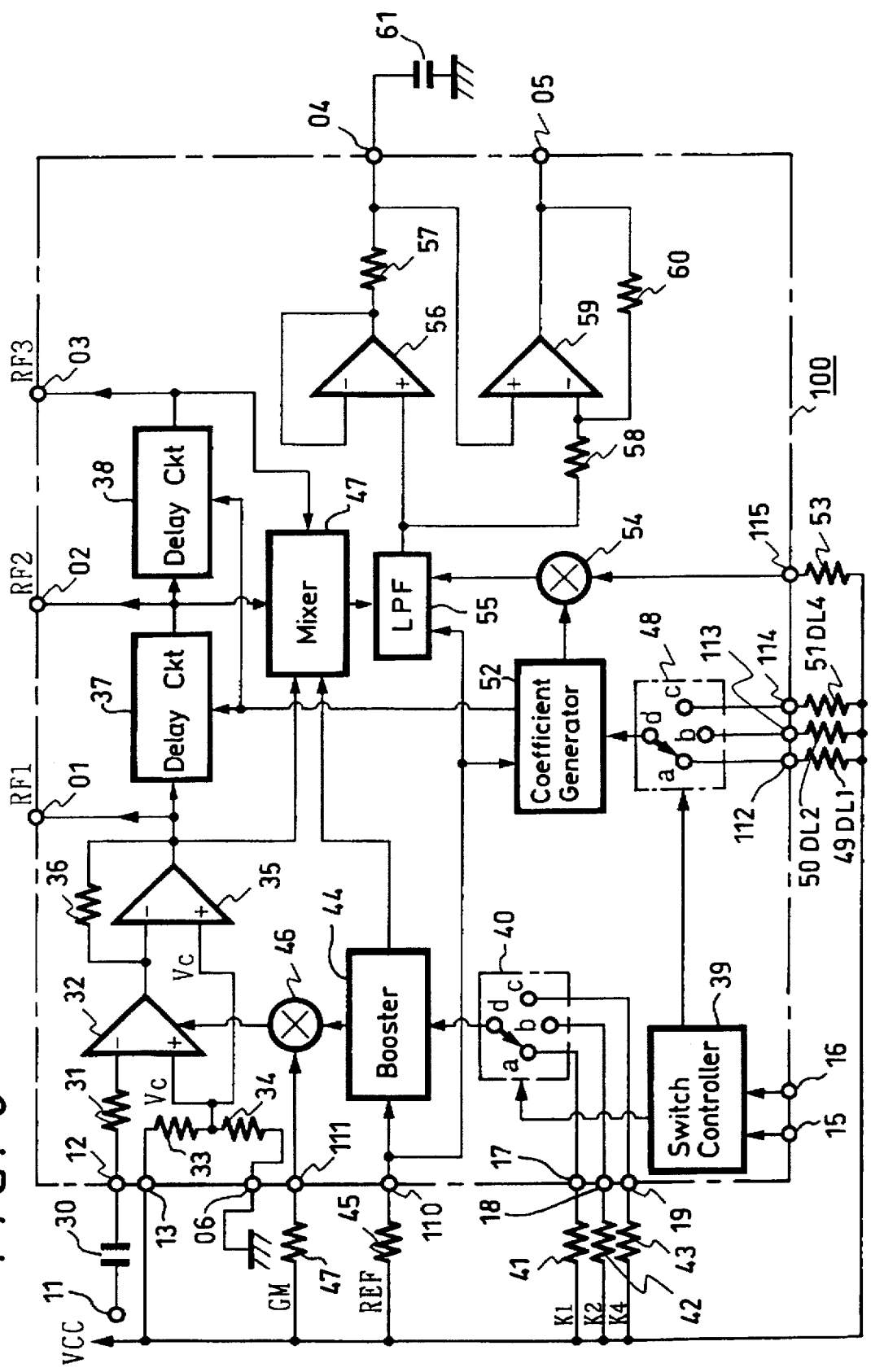
FIG. 8 is a circuit diagram showing an internal arrangement of an equalizer in the optical disk apparatus shown in FIG. 7.

FIG. 8 shows an internal structure of the equalizer 23. The circuit shown in FIG. 8 in its entirety corresponds to the equalizer 23 shown in FIG. 7, and includes circuit components, including terminals, enclosed in the dot-and-dash line which are incorporated in a semiconductor integrated circuit. FIGS. 9A through 9D are illustrative of cutoff frequencies of the equalizer 23 shown in FIG. 8.

As shown in FIG. 8, an input terminal I1 which is supplied with an RF signal from the playback amplifier 9 shown in FIG. 7 is connected through a DC cutoff capacitor 30 to an input terminal I2 of a semiconductor integrated circuit 100. The input terminal I2 is connected through a resistor 31 to an inverting input terminal (−) of an operational amplifier 32. The operational amplifier 32 has a noninverting input terminal (+) connected to a junction between resistors 33, 34 for dividing the voltage from a power supply VCC. The operational amplifier 32 has an output terminal connected to an inverting input terminal (−) of an operational amplifier 35. The resistor 33 has an end connected through an input terminal I3 to the power supply VCC. The other end of the resistor 33 is connected to an end of the resistor 34, whose other end is connected through an output terminal O6 to ground.

The operational amplifier 35 has a noninverting input terminal (+) connected to the junction between resistors 33, 34, and an output terminal connected to an input terminal of a delay circuit 37 and also to an output terminal O1 of a semiconductor integrated circuit 100 and a first input terminal of a mixer 47. The inverting input terminal (−) and the output terminal of the operational amplifier 35 are connected to each other through a resistor 36.

The delay circuit 37 has an output terminal connected to an input terminal of a delay circuit 38, an output terminal O2 of the semiconductor integrated circuit 100, and a third input terminal of the mixer 47. The delay circuit 38 has an output terminal connected to an output terminal O3 of the semiconductor integrated circuit 100 and a fourth input terminal of the mixer 47. The semiconductor integrated circuit 100 has input terminals I5, I6 connected to respective input terminals of a switch controller 39, which has an output terminal connected to a control terminal of a switch 40 and another output terminal connected to a control terminal of a switch 48.

The switch 40 has fixed terminals a, b, c connected to the power supply VCC through respective input terminals I7, I8, I9 of the semiconductor integrated circuit 100 and respective resistors 41, 42, 43. The switch 40 has a movable contact d connected to an input terminal of a booster 44. The booster 44 has another input terminal connected to the power supply VCC through an input terminal I10 of the semiconductor integrated circuit 100 and a resistor 45, and also to a first input terminal of a low-pass filter 55 and an input terminal of a coefficient generator 52. The booster 44 has an output terminal connected to a second input terminal of the mixer 47 and another output terminal connected to an input terminal of a multiplier 46. The multiplier 46 has another input terminal connected to the power supply VCC through an input terminal I11 of the semiconductor integrated circuit 100 and a resistor 47. The multiplier 46 has an output terminal connected to a voltage control terminal of the operational amplifier 32.

The switch 48 has fixed terminals a, b, c connected to the power supply VCC through respective input terminals I12, I13, I14 of the semiconductor integrated circuit 100 and respective resistors 49, 50, 51. The switch 48 has a movable contact d connected to another input terminal of the coefficient generator 52. The coefficient generator 52 has an output terminal connected to respective other input terminals of the delay circuits 37, 38, and another output terminal connected to an input terminal of a multiplier 54. The multiplier 54 has another input terminal connected to the power supply VCC through an input terminal I15 of the semiconductor integrated circuit 100 and a resistor 53. The multiplier 54 has an output terminal connected to a second input terminal of the low-pass filter 55.

The low-pass filter 55 has a third input terminal connected to an output terminal of the mixer 47, and an output terminal connected to a noninverting input terminal (+) of an operational amplifier 56 and connected through a resistor 58 to an inverting input terminal (−) of an operational amplifier 59. The operational amplifier 56 has an inverting input terminal (−) connected to an output terminal thereof, which is connected through a resistor 57 to a non-inverting input terminal (+) of the operational amplifier 59 and is also grounded through a resistor 57, an output terminal O4 of the semiconductor integrated circuit 100, and a smoothing capacitor 61. The inverting input terminal (−) of an operational amplifier 59 is connected to an output terminal thereof through a resistor 60, and the output terminal of the operational amplifier 59 is connected to an output terminal O5 of the semiconductor integrated circuit 100. The output terminal O5 is connected to the input terminal of the digital signal processor 12 shown in FIG. 7.

The resistors 33, 34 have the same resistance, and hence a voltage VC which is ½ of the voltage VCC of the power supply VCC is present at the voltage at the junction between these resistors 33, 34.

The voltage VCC is 5 V, and the voltage VC (central potential) is 2.5 V, for example. In FIG. 8, GM represents a gain current, REF a reference current, K1, K2, K4 currents as coefficients determined by the respective resistances of the resistors 41, 42, 43 and corresponding respectively to the normal speed, the double speed, and the fourfold speed, and DL1, DL2, DL4 currents as delays determined by the respective resistances of the resistors 49, 50, 51 and corresponding respectively to the normal speed, the double speed, and the fourfold speed. The DC. cutoff capacitor 30 has a capacitance of 1 μF, for example, the resistors 31, 36, 57, 58, 60 have respective resistances of 30 KΩ, 3 KΩ, 1 KΩ, 4 KΩ, 40 KΩ, and an RF signal outputted from the output terminal O5 has an amplitude of 1 Vpp.

The resistors 41, 42, 43 have respective resistances of 10 KΩ, 8.2 KΩ, 3.9 KΩ, and the resistors 49, 50, 51 have respective resistances of 27 KΩ, 12 KΩ, 4.7 KΩ.

The smoothing capacitor 61 has a capacitance of 10 μF, for example. The smoothing capacitor 61 serves to smooth an RF signal to produce a DC potential, amplifying the RF signal by a factor of 10, for example.

The output terminals O1, O2, O3 are used to monitor waveforms with an oscilloscope or the like. The output terminal O1 serves to output a normal RF signal RF1. The output terminal O2 serves to output an RF signal RF2 which has been delayed by the delay circuit 37. The output terminal O3 serves to output an RF signal RF3 which has been delayed by both the delay circuits 37, 38. The delay time of the delay circuit 37 is the same as the delay time of the delay circuit 48.

The switch controller 39 serves to control the switching of the switches 40, 48 based on control data supplied from the equalizer characteristics switching means 22 shown in FIG. 7 through the input terminals I5, I6 and the contents of an equalizer characteristics switching table (described later on). The switch 40 operates to switch the currents as the coefficients K1, K2, K3 determined depending on the resistances of the resistors 41, 42, 43, and the switch 48 operates to switch the currents as the delay time information determined depending on the resistances of the resistors 49, 50, 51. The movable contacts d of the switches 40, 48 are movable in ganged relation under the control of the switch controller 39.

The low-pass filter 55 comprises a Bessel-function 5th-order low-pass filter, for example. The Bessel-function 5th-order low-pass filter causes the waveforms of RF signals to be delayed by a constant time and hence does not produce waveform distortions because group delay characteristics in a passband thereof, i.e., propagation delay characteristics between input and output signals at the time the frequency of a sine-wave input signal of a constant magnitude is varied, is constant. The cutoff frequency of the low-pass filter 55 is determined by the resistance of the resistor 53 and the reference current REF. The resistor 53 comprises a variable resistor such as a cermet volume or the like. The cutoff frequency of the low-pass filter 55 can be varied by varying the resistance of the resistor 53.

Figures 9A, 9B, 9C, 9D:
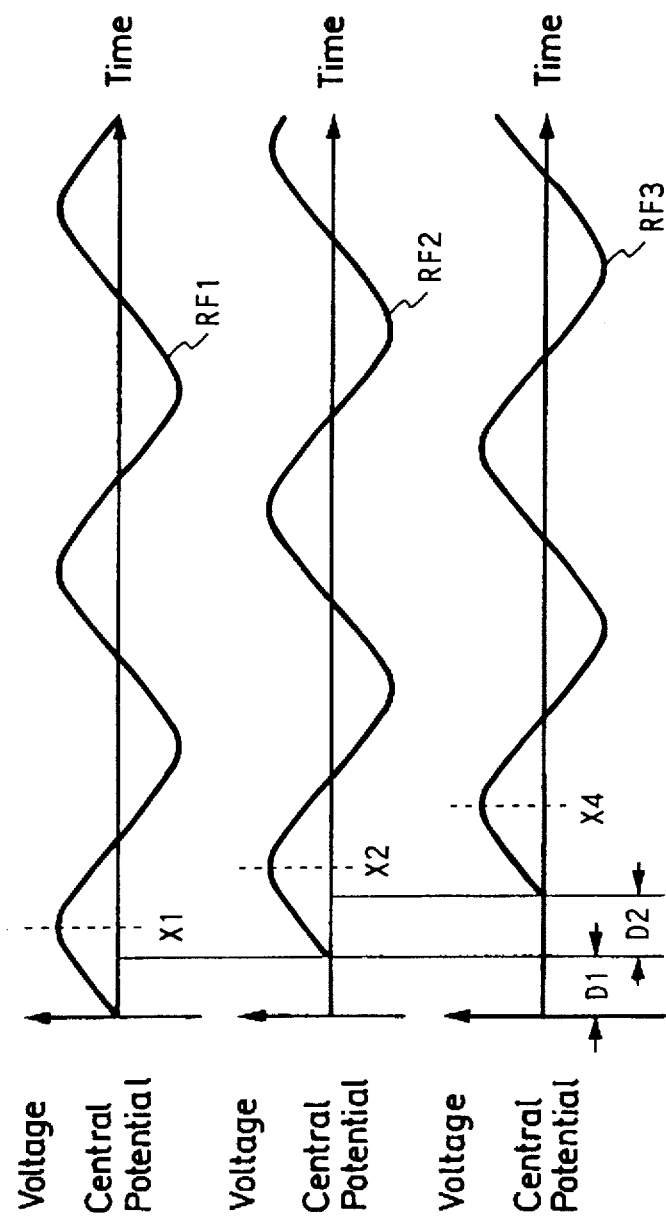
FIG. 9A is a diagram showing the waveform of an RF signal RF1 outputted from an output terminal O1 of the equalizer shown in FIG. 8.
FIG. 9B is a diagram showing the waveform of an RF signal RF2 outputted from an output terminal O2 of the equalizer shown in FIG. 8.
FIG. 9C is a diagram showing the waveform of an RF signal RF3 outputted from an output terminal O3 of the equalizer shown in FIG. 8.
FIG. 9D is a diagram showing cutoff frequencies depending on the playback speed.

A process of varying the cutoff frequency of the low-pass filter 55 will be described below with reference to FIGS. 9A through 9D. FIGS. 9A, 9B, and 9C show the RF signals RF1, RF2, RF3 outputted respectively from the output terminals O1, O2, O3 shown in FIG. 8. In each of FIGS. 9A, 9B, and 9C, the vertical axis represents voltage and the horizontal axis represents time. In FIG. 9C, "D1" indicates the delay time of the delay circuit 37 and "D2" indicates the delay time of the delay circuit 38. In FIGS. 9A, 9B, and 9C, "X1", "X2", "X4" indicate the respective times of maximum amplitudes of the RF signals RF1, RF2, RF3, and correspond to an output signal from the coefficient generator 52.

FIG. 9D shows the cutoff frequencies of the low-pass filter 55. In FIG. 9D, the vertical axis represents voltage and the horizontal axis represents time, and "Y1", "Y2", "Y4" indicate the cutoff frequencies, respectively, at the normal speed, the double speed, and the fourfold speed.

If it is assumed that boosting frequencies at the normal speed, the double speed, and the fourfold speed are represented by fb1, fb2, fb4, respectively, then the cutoff frequency Y1 at the normal speed is calculated as Y1=n·fb1, the cutoff frequency Y2 at the double speed is calculated as Y2=n·fb2, and the cutoff frequency Y4 at the fourfold speed is calculated as Y4=n·fb4 where "n" is the resistance of the resistor 53 and is selected to be "2" (which means twice the boosting frequency of the equalizer), for example.

The boosting frequency will be described below. If the delay circuit 37 has a delay time D1 and the delay circuit 38 has a delay time D2, then the boosting frequency fb is expressed as fb=½τ where τ=D1=D2.

At the normal speed, since ½τ1=1.5 MHz, τ1 is 333 nsec.

At the double speed, since ½τ2=3.0 MHz, τ2 is 167 nsec.

At the fourfold speed, since ½τ4=6.0 MHz, τ4 is 83 nsec.

Operation of the equalizer 23 shown in FIG. 8 will be described below.

When control data from the equalizer characteristics switching means 22 are supplied to the equalizer 23 through the input terminals I5, I6 of the semiconductor integrated circuit 100, the switch controller 39 supplies a switch control signal to the switches 40, 48 based on the supplied control data for connecting their movable contact d to the fixed contact a, b, or c.

Now, the current as the coefficient K1, K2, or K4 is supplied through the input terminal I7, I8, or I9 of the semiconductor integrated circuit 100 and the switch 40 to the booster 44.

The booster 40 generates a gain adjusting current based on the value of the current supplied as the coefficient K1, K2, or K4 through the switch 40 and the value of the reference current REF supplied through the input terminal I10 of the semiconductor integrated circuit 100, and supplies the generated gain adjusting current to the multiplier 46 and the mixer 47.

The current as the delay time information DL1, DL2, or DL4 is supplied through the input terminal I12, I13, or I14 of the semiconductor integrated circuit 100 and the switch 48 to the coefficient generator 52.

The RF signal from the playback amplifier 9 shown in FIG. 7 is supplied through the input terminal I1 and the capacitor 30 to the input terminal I2 of the semiconductor integrated circuit 100, and then supplied through the input terminal I2 and the resistor 31 to the inverting input terminal (−) of the operational amplifier 32.

The multiplier 46 is also supplied with the gain control current GM determined by the resistance of the resistor 47 through the input terminal I11 of the semiconductor integrated circuit 100. The multiplier 46 multiplies the gain control current GM and the current supplied as the coefficient from the booster 44, and supplies a current representing the product as a voltage control current to the voltage control terminal of the operational amplifier 32. The operational amplifier 32 generates the difference between the potential of the RF signal supplied to the inverting input terminal (−) thereof and the reference potential supplied to the noninverting input terminal (+) thereof, amplifies a voltage corresponding to the difference based on the value of the voltage control current from the multiplier 46, and outputs the amplified voltage.

The outputted voltage from the operational amplifier 32 is supplied to the inverting input terminal (−) of the operational amplifier 35, which generates the difference between the supplied voltage and the reference voltage, amplifies the differential voltage, and outputs the amplified voltage. The outputted voltage from the operational amplifier 35 is supplied to the output terminal O1 for monitoring the voltage, the delay circuit 37, and the mixer 47.

The coefficient generator 52 generates a delay time adjusting current based on the value of the current supplied as the delay time information DL1, DL2, or DL4 through the switch 48, and the reference current REF supplied through the input terminal I10 of the semiconductor integrated circuit 100. The coefficient generator 52 supplies the generated delay time adjusting current to the delay circuits 37, 38 and also supplies the current as a coefficient to the multiplier 54. The delay circuit 37 delays the RF signal from the operational amplifier 35 by a delay time based on the value of the delay time adjusting current from the coefficient generator 52. A delayed output signal from the delay circuit 37 is supplied to the output terminal O2 for monitoring the signal, and also to the mixer 47 and the delay circuit 38. The delay circuit 38 delays the RF signal from the delay circuit 37 by a delay time based on the value of the delay time adjusting current from the coefficient generator 52. A delayed output signal from the delay circuit 38 is supplied to the output terminal O3 for monitoring the signal, and also to the mixer 47.

The mixer 47 mixes the RF signal from the operational amplifier 35, the delayed RF signal from the delay circuit 37, and the delayed RF signal from the delay circuit 38 with each other at a mixing ratio based on the current supplied as the coefficient from the booster 44. A mixed output signal from the mixer 47 is supplied to the low-pass filter 55. The multiplier 54 multiplies the current corresponding to "n" from the resistor 53 and the current as the coefficient corresponding to "X" from the coefficient generator 52 to produce a current corresponding to the cutoff frequency "Y", and supplies the produced current as a cutoff frequency adjusting current to the low-pass filter 55.

The low-pass filter 55 biases the mixed output signal from the mixer 47 with the reference current REF supplied through the input terminal I10 of the semiconductor integrated circuit 100, and cuts off high-frequency components of the mixed output signal from the mixer 47 based on the cutoff frequency represented by the value of the cutoff frequency adjusting current from the multiplier 54. The low-pass filter 55 supplies an output signal to the noninverting input terminal (+) of the operational amplifier 56 and also to the inverting input terminal (−) of the operational amplifier 59 through the resistor 58.

The operational amplifier 56 generates the difference between the output signal from the low-pass filter 55 and its own output signal, and outputs a differential signal, which is supplied to the noninverting input terminal (+) of the operational amplifier 59. The capacitor 61 charges and discharges a current determined by the resistance of the resistor 57 depending on the output signal from the operational amplifier 56, for thereby smoothing the output signal from the operational amplifier 56 to produce a DC potential. The potential of the output signal from the operational amplifier 56 is amplified by a factor of 10. The operational amplifier 59 generates the difference between the output signal from the low-pass filter 55 and the output signal from the operational amplifier 56, and outputs a differential signal as an RF signal through the output terminal O5 of the semiconductor integrated circuit 100 to the digital signal processor 12 shown in FIG. 7.

FIG. 10A shows, by way of example, the equalizer characteristic switching table data 20c stored in the ROM 20 shown in FIG. 7. FIG. 10B shows, by way of example, a switch control table stored in the switch controller 39 shown in FIG. 8.

As shown in FIG. 10A, the equalizer characteristic switching table data 20c are composed of "mode" data represented by the speed command data from the host computer 18 shown in FIG. 7, "mode indicating" data for switching the characteristics of the equalizer 23 depending on the "mode", and "coefficient" data and "delay time" data depending on the "mode indicating" data. The "coefficient" data and "delay time" data are illustrated for reference only, and may not be contained in the equalizer characteristic switching table data 20c.

As can be seen from FIG. 10A, when the "mode" indicates the "normal speed", the "mode indicating" data are "01", the "coefficient" established by the "mode indicating" data is "K1", and the "delay time" established by the "mode indicating" data is "DL1".

When the "mode" indicates the "double speed", the "mode indicating" data are "10", the "coefficient" established by the "mode indicating" data is "K2", and the "delay time" established by the "mode indicating" data is "DL2".

When the "mode" indicates the "fourfold speed", the "mode indicating" data are "11", the "coefficient" established by the "mode indicating" data is "K4", and the "delay time" established by the "mode indicating" data is "DL4".

As shown in FIG. 10B, the switch control table is composed of control data from the equalizer characteristics switching means 22 shown in FIG. 7, i.e., the "mode indicating" data shown in FIG. 10A, data indicative of a fixed contact to be connected to the movable contact d of the switch 40 (see FIG. 8) as the coefficient switch, depending on the "mode indicating" data, and data indicative of a fixed contact to be connected to the movable contact d of the switch 40 (see FIG. 8) as the delay time switch, depending on the "mode indicating" data.

As can be seen from FIG. 10B, when the "mode indicating" data are "01", the fixed contact to be connected to the movable contact d of the switch 40 shown in FIG. 8 is indicated by "a".

When the "mode indicating" data are "10", the fixed contact to be connected to the movable contact d of the switch 40 shown in FIG. 8 is indicated by "b".

When the "mode indicating" data are "11", the fixed contact to be connected to the movable contact d of the switch 40 shown in FIG. 8 is indicated by "c".

Figure 11:
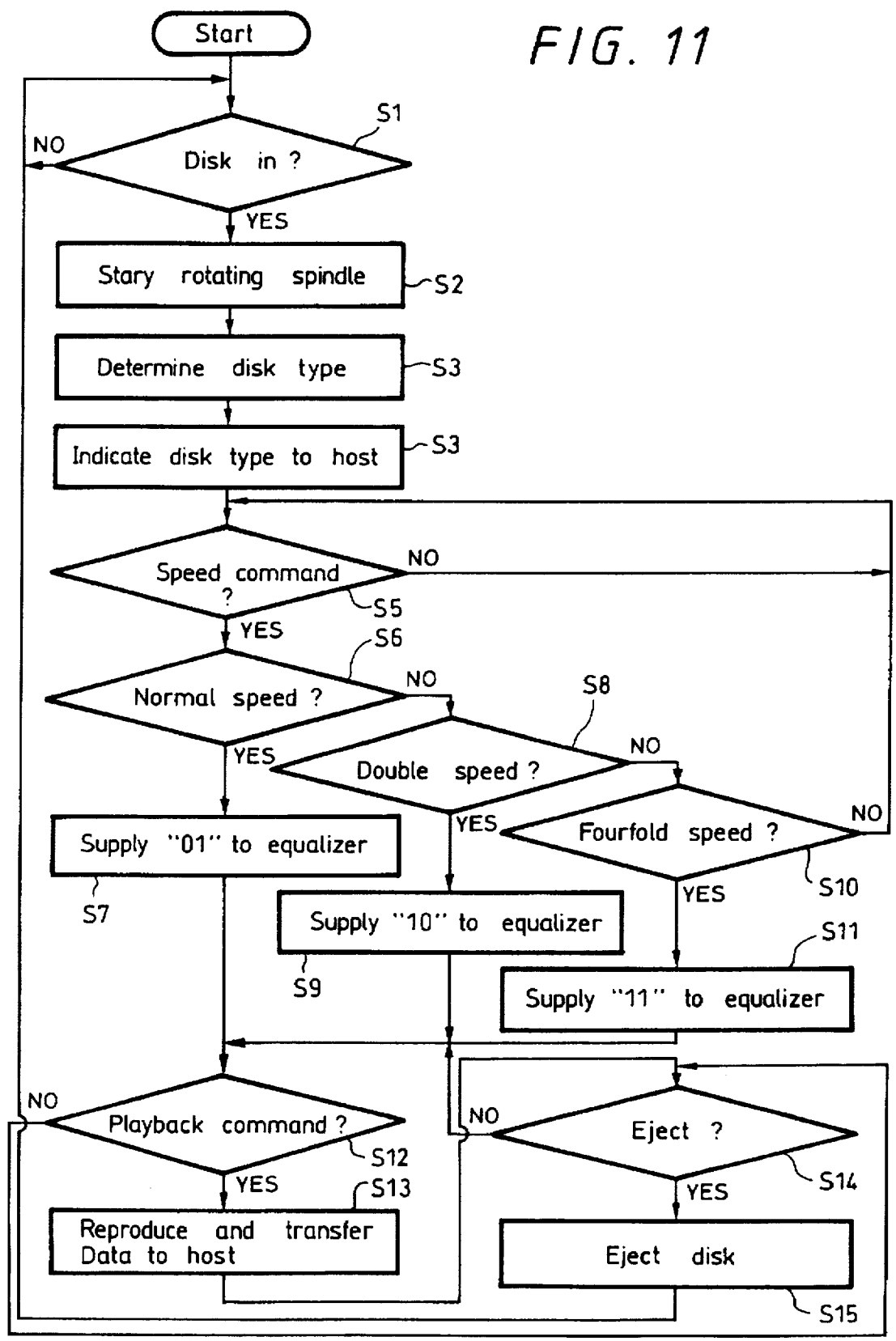
FIG. 11 is a flowchart of an operation sequence of the optical disk apparatus shown in FIG. 7.

FIG. 11 shows an operation sequence of the optical disk apparatus which has been described above with reference to FIGS. 7 through 10A, 10B.

As shown in FIG. 11, the system control means 16 shown in FIG. 7 determines whether the optical disk 7 is loaded or not in a step S1. If "YES", then control proceeds to a step S2.

In the step S2, the system control means 16 controls the servo system signal processor 5 to energize the spindle motor 6. Then, control proceeds to a step S3.

In the step S3, the system control means 16 determines whether the optical disk 7 is a CD-ROM or a CD-R based on a control bit in reproduced data. Then, control proceeds to a step S4. While in the above operation, other components of the optical disk apparatus operate as follows: The servo system signal processor 5 energizes a thread feed motor and a tracking actuator to move the optical pickup 8 radially with respect to the optical disk 7 to position the optical pickup 8 in a lead-in area of the optical disk 7. The optical pickup 8 now successively outputs an RF signal. The RF signal from the optical pickup 8 is supplied through the playback amplifier 9, the equalizer 23, and the digital signal processor 12 to the decoder 13, which decodes the RF signal into original data. The system control means 16 reads a control bit from the reproduced data to determine the type of the optical disk 7.

In the step S4, the system control means 16 supplies the control bit indicative of the type of the optical disk 7 as disk information data to the host computer 18 through the host interface 14 and the SCSI bus 17. The host computer 18 displays the contents of the disk information data from the optical disk drive as an image on the non-illustrated television monitor, and waits for a playback speed command. When a playback speed command is entered, the host computer 18 supplies playback speed command data indicative of whether the playback speed is a normal speed, a double speed, or a fourfold speed through the SCSI bus 17, the host interface 14, and the input/output port 10 to the equalizer characteristics judging means 21.

In a step S5, the system control means 16 determines whether speed command data are supplied from the host computer 18 or not. If "YES", then control goes to a step S6.

In the step S6, the equalizer characteristics judging means 21 refers to the equalizer characteristic switching table data 20c read from the ROM 20 and stored in the RAM 3 to determine whether the speed command data supplied from the host computer 18 represent the "normal speed" or not. If "YES", then control goes to a step S7, and if "NO", then control goes to a step S8.

In the step S7, the equalizer characteristics switching means 22 supplies control data "01" to the switch controller 39 through the input terminals I5, I6 of the semiconductor integrated circuit 100 shown in FIG. 8. Thereafter, control proceeds to a step S12.

In the step S8, the equalizer characteristics judging means 21 refers to the equalizer characteristic switching table data 20c read from the ROM 20 and stored in the RAM 3 to determine whether the speed command data supplied from the host computer 18 represent the "double speed" or not. If "YES", then control goes to a step S9, and if "NO", then control goes to a step S10.

In the step S9, the equalizer characteristics switching means 22 supplies control data "10" to the switch controller 39 through the input terminals I5, I6 of the semiconductor integrated circuit 100. Thereafter, control proceeds to the step S12.

In the step S10, the equalizer characteristics judging means 21 refers to the equalizer characteristic switching table data 20c read from the ROM 20 and stored in the RAM 3 to determine whether the speed command data supplied from the host computer 18 represent the "fourfold speed" or not. If "YES", then control goes to a step S11, and if "NO", then control goes back to the step S5.

In the step S11, the equalizer characteristics switching means 22 supplies control data "11" to the switch controller 39 through the input terminals I5, I6 of the semiconductor integrated circuit 100. Thereafter, control proceeds to the step S12.

In the step S12, the system control means 16 determines whether there is a playback command from the host computer 18 or not. If "YES", then control goes to a step S13, and if "NO", then control goes back to the step S14.

In the step S13, the system control means 16 controls the servo system signal processor 5 based on playback command data (which comprises data indicative of readout and data indicative of an address) from the host computer 18 to reproduced data from the optical disk 7. Then, control goes to the step S14.

In the step S14, the system control means 16 determines whether there is an eject command from the host computer 18 or not. If "YES", then control goes to a step S15, and if "NO", then control goes back to the step S12.

In the step S15, the system control means 16 controls the servo system signal processor 5 to de-energize the spindle motor 6 and controls a drive circuit for a motor to actuate a disk loading mechanism for ejecting the optical disk 7. Then, control returns to the step S1.

Selection of characteristics of the equalizer 23 and correction of an MTF based on the selected characteristics of the equalizer 23 will be described below.

For selecting characteristics of the equalizer 23, it is necessary to obtain measured values of optical frequency characteristics of an MTF of the optical pickup 8, convert the measured optical frequency characteristics into electric frequency characteristics, and obtain equalizer characteristics for correcting the electric frequency characteristics depending on the playback speed. Therefore, the optical frequency characteristics of the optical pickup 8 will first be described with reference to FIG. 12. Then, conversion of the optical frequency characteristics into electric frequency characteristics will be described with reference to FIG. 13. Thereafter, correction of the electric frequency characteristics depending on the playback speed with selected equalizer characteristics, and measured values of the corrected electric frequency characteristics will be described with reference to FIGS. 14A, 14B through 17.

Figure 12:
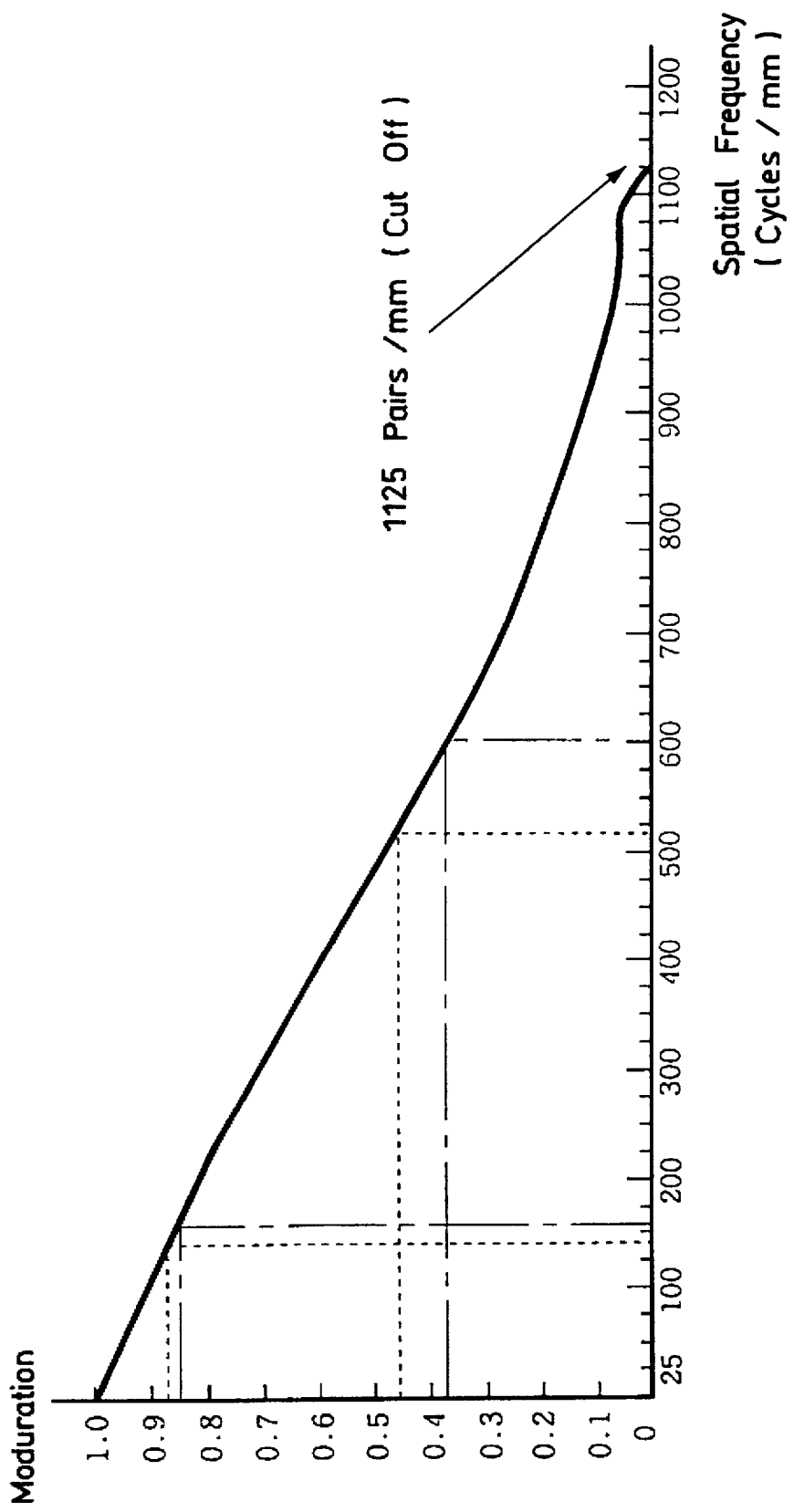
FIG. 12 is a graph showing optical frequency characteristics indicative of measured values of the MTF of an optical pickup.

FIG. 12 shows measured values of the optical frequency characteristics of the MTF of the optical pickup 8. In FIG. 12, the vertical axis represents the degree of modulation and the horizontal axis represents the spatial frequency. The degree of modulation corresponds to the length of pits formed on the optical disk 7. The greater the length of pits, the greater the degree of modulation. The spatial frequency represents the number of pairs of pits and lands within a length of 1 mm along the track on the optical disk 7. Therefore, the graph shown in FIG. 12 illustrates measured values of the degree of modulation and the spatial frequency when the pits on the optical disk 7 are scanned with a beam spot having a finite size. As the number of pairs of pits and lands within 1 mm is smaller (the pits are longer), the degree of modulation is greater. As the number of pairs of pits and lands within 1 mm is greater (the pits are shorter), the degree of modulation is smaller. As shown in FIG. 12, the cutoff frequency corresponds to 1125 pairs/mm.

Figure 13:
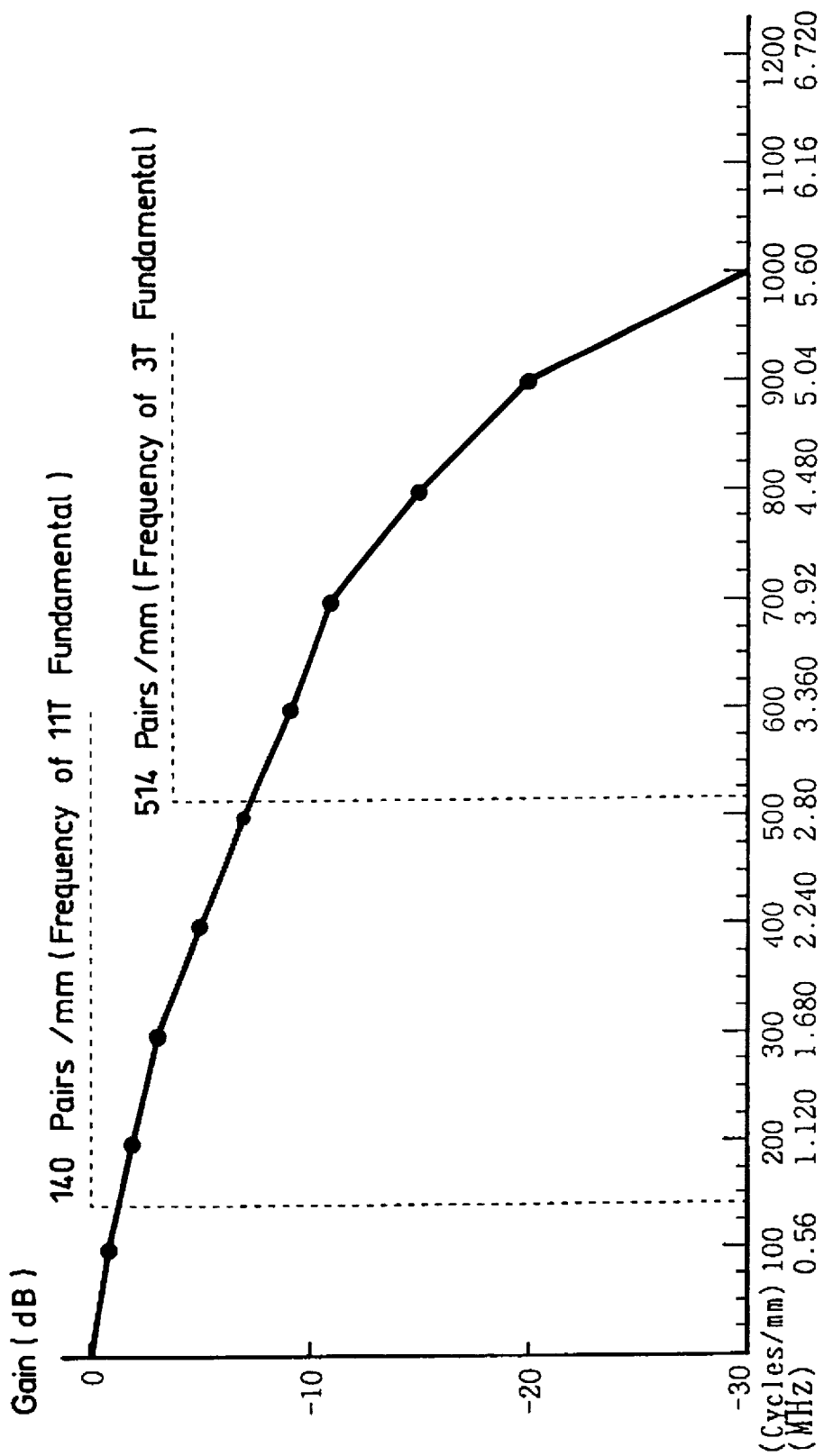
FIG. 13 is a graph showing electric frequency characteristics converted from the optical frequency characteristics shown in FIG. 12.

FIG. 13 shows electric frequency characteristics converted from the spatial frequency characteristics shown in FIG. 12. In FIG. 13, the vertical axis represents the gain (dB) and the horizontal axis represents the spatial frequency (pairs/mm). The spatial frequencies are associated with corresponding frequencies (MHz) indicated therebelow. FIG. 13 shows the spatial frequencies for the fundamentals 3 T and 11 T, i.e., 514 pairs/mm for the fundamental 3 T, and 140 pairs/mm for the fundamental 11 T.

The conversion from a spatial frequency to a frequency is expressed by the following equation (1):

$$\text{Number of pairs in 1 mm} \times S \times \text{linear velocity (corresponding to S)} \quad (1)$$

where S is a factor indicative of a playback speed, and is "1" for a normal speed, "2" for a double speed, and "3" for a triple speed.

For example, since the cutoff frequency at the fourfold speed corresponds to a spatial frequency of 1125 pairs/mm, it is substituted in the above equation (1). Therefore, the cutoff frequency at the fourfold speed is $1125 \times 4 \times 1.4 = 6.3$ MHz.

Inasmuch as the optical frequency characteristics of the optical pickup 8 are responsible for a degradation of the waveform of the RF signal, if the degradation is to be electrically compensated for by the equalizer 23, then the equalizer 23 may have electric frequency characteristics which are a reversal of the electric frequency characteristics shown in FIG. 13 which have been converted from the optical frequency characteristics shown in FIG. 12.

Generally, it has been considered that for recovering the amplitude of the waveform of 3 T, the boosting frequency of the equalizer 23 may be in conformity with the frequency of the pattern 3 T.

From the above analysis, it has been found out that for shaping waveforms with a cosine equalizer, it is more effective for the equalizer to boost frequencies using a boosting central frequency which is twice the frequency of 3 T. Therefore, for establishing the boosting frequency of the equalizer 23 shown in FIGS. 7 and 8, the S/N ratio will not be deteriorated if the boost gain is lowered in the absence of any bits corresponding to frequencies above 6 MHz. Thus, the boosting frequency is set to about 6 MHz. Details of the determination of the boosting frequency will be described below.

Figure 14A:
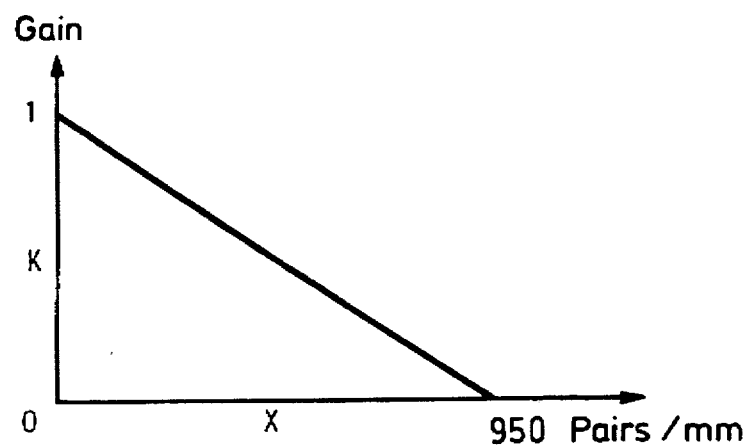
FIG. 14A is a graph modeled from the measured values of the MTF of the optical pickup.

Higher-harmonic components of an RF signal waveform are attenuated depending on the MTF which is governed by the aperture ratio of the objective of the optical pickup and the wavelength of the laser beam. If attenuation coefficients for the attenuation of higher-harmonic components are calculated and applied to multiply the terms of a Fourier expansion, then an equation representing the waveform is obtained. FIG. 14A is a graph modeled from the measured values of the MTF of the optical pickup. In FIG. 14A, the vertical axis represents the attenuation coefficients K and the horizontal axis represents the number of tracks in 1 mm (the spatial frequency in 1 mm).

The attenuation coefficients K are numerically expressed as follows:

$$K = 1 - (1/950)X \quad (2)$$

If the spatial frequency represented by the above equation (2) is converted into an electric frequency, it is expressed as follows:

$$K = 1 - (1/950) \times (10^3/1.4(\text{m/s}) \times 4(\text{double speed})) \times \quad (3)$$

$$f(\text{MHz}) = 1 - (f(\text{Hz})/5.32 \times 10^6)$$

For example, first- and third-order attenuation coefficients K1, K3 at 3 T are given by respective equations (4), (5) as follows:

$$K1 = 1 - (2.88 \times 10^6)/(5.32 \times 10^6) = 0.459 \quad (4)$$

$$K2 = 1 - (3.2 \times 2.88 \times 10^6)/(5.32 \times 10^6) \quad (5)$$
$$= -0.62 (<0 \to 0)$$

As can be seen from the above equation (5), the attenuation coefficients for the third- and higher-order waveforms are 0 or smaller, i.e., do not exist. From the above equations (4) and (5), a Fourier series expansion of 3 T is expressed by the following equation (6):

$$f(t) = 4/\pi \cdot 0.46 \cdot \text{SIN}_{\omega 3 T t} \quad (6)$$

where $\omega 3T$ represents a constant of angular velocity and t represents time.

Similarly, attenuation coefficients at 4 T through 11 T are given as follows:

$4T : K1 = 0.59$
$5T : K1 = 0.67 \quad K3 = 0.024$
$6T : K1 = 0.73 \quad K3 = 0.18$
$7T : K1 = 0.77 \quad K3 = 0.31$
$8T : K1 = 0.80 \quad K3 = 0.39$
$9T : K1 = 0.82 \quad K3 = 0.46 \quad K5 = 0.10$
$10T : K1 = 0.84 \quad K3 = 0.51 \quad K5 = 0.19$
$11T : K1 = 0.85 \quad K3 = 0.56 \quad K5 = 0.26$ Consequently, the RF signal waveforms after they have been attenuated by the MTF are expressed respectively by the following equations (7) through (15):

$$3T : f(t) = 4/\pi \cdot 0.46 \cdot \text{SIN}_{\omega 3 T t} \quad (7)$$

$$4T : f(t) = 4/\pi \cdot 0.59 \cdot \text{SIN}_{\omega 4 T t} \quad (8)$$

$$5T : f(t) = 4/\pi \cdot 0.67 \cdot \text{SIN}_{\omega 5 T t} + \quad (9)$$
$$4/3\pi \cdot 0.02 \cdot \text{SIN}_{3\omega 5 T t}$$

$$6T : f(t) = 4/\pi \cdot 0.73 \cdot \text{SIN}_{\omega 6 T t} + \quad (10)$$
$$4/3\pi \cdot 0.18 \cdot \text{SIN}_{3PMEGA6 T t}$$

$$7T : f(t) = 4/\pi \cdot 0.77 \cdot \text{SIN}_{\omega 7 T t} + \quad (11)$$
$$4/3\pi \cdot 0.31 \cdot \text{SIN}_{3\omega 7 T t}$$

$$8T : f(t) = 4/\pi \cdot 0.80 \cdot \text{SIN}_{\omega 8 T t} + \quad (12)$$
$$4/3\pi \cdot 0.39 \cdot \text{SIN}_{3\omega 8 T t}$$

$$9T : f(t) = 4/\pi \cdot 0.82 \cdot \text{SIN}_{\omega 9 T t} + \quad (13)$$
$$4/3\pi \cdot 0.46 \cdot \text{SIN}_{3\omega 9 T t} +$$
$$4/5\pi \cdot 0.10 \cdot \text{SIN}_{5\omega 9 T t}$$

$$10T : f(t) = 4/\pi \cdot 0.84 \cdot \text{SIN}_{\omega 10 T t} + \quad (14)$$
$$4/3\pi \cdot 0.51 \cdot \text{SIN}_{3\omega 10 T t} +$$
$$4/5\pi \cdot 0.19 \cdot \text{SIN}_{5\omega 10 T t}$$

$$11T : f(t) = 4/\pi \cdot 0.85 \cdot \text{SIN}_{\omega 11 T t} + \quad (15)$$
$$4/3\pi \cdot 0.56 \cdot \text{SIN}_{3\omega 11 T t} +$$
$$4/5\pi \cdot 0.26 \cdot \text{SIN}_{5\omega 11 T t}$$

Figure 14B:
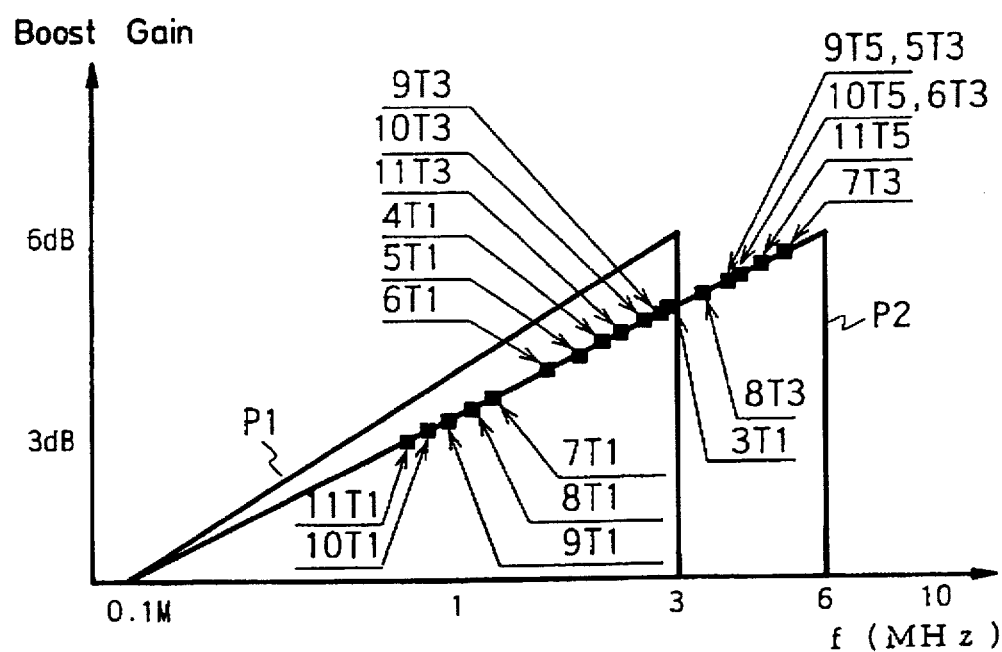
FIG. 14B is a graph showing the characteristics of a cosine equalizer having frequencies of 3 T and 1.5 T used as a central frequency for boosting.

FIG. 14B shows characteristic curves P1, P2 of a cosine equalizer having frequencies of 3 T and 1.5 T used as a central frequency for boosting. In FIG. 14B, a suffix "1" added to T represents a fundamental, a suffix "3" added to T represents a third harmonic, and a suffix "5" added to T represents a fifth harmonic.

As can be understood from the characteristic curves P1, P2 shown in FIG. 14B, when the signal is boosted at a central frequency of 3 T, almost no gain is imparted to harmonics equal to and higher than the third harmonic 8T3 of 8 T. When the signal is boosted at a central frequency of 1.5 T, all the harmonics are boosted.

If almost no gain is imparted to harmonics equal to and higher than a certain frequency among all the harmonics, then the gradient of the waveform becomes irregular. For example, if a gain is imparted to a fundamental of 8 T but almost no gain is imparted to third- and fifth-harmonic waveforms, then only the fundamental of 8 T will remains. Since the original RF signal waveform of 8 T is composed of the waveforms of a fundamental, a third harmonic, and a fifth harmonic, the gradient of an RF signal waveform of 8 T boosted at a central frequency of 3 T is smaller than the gradient of an RF signal waveform of 8 T which is not boosted. The above gradients of RF signal waveforms will be described in detail with reference to FIGS. 15 through 17 which show, respectively, an RF signal waveform which is not boosted, an RF signal waveform which is boosted at a central frequency of 3 T, and an RF signal waveform which is boosted at a central frequency of 1.5 T, the RF signal waveforms being generated using the above equations (7) through (15).

Figure 15:
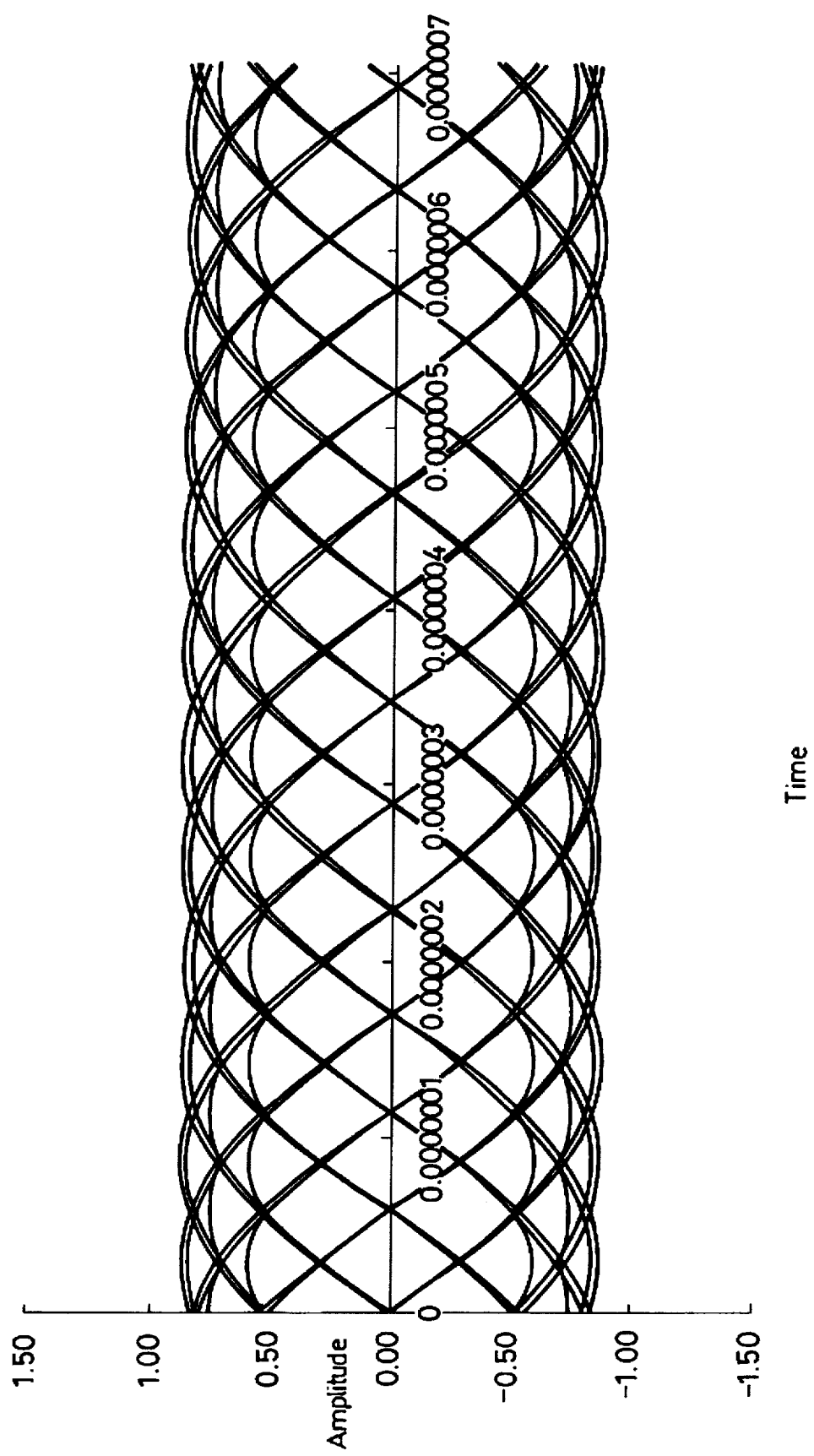
FIG. 15 is a diagram showing the waveform of an RF signal which is not boosted at all.
Figure 16:
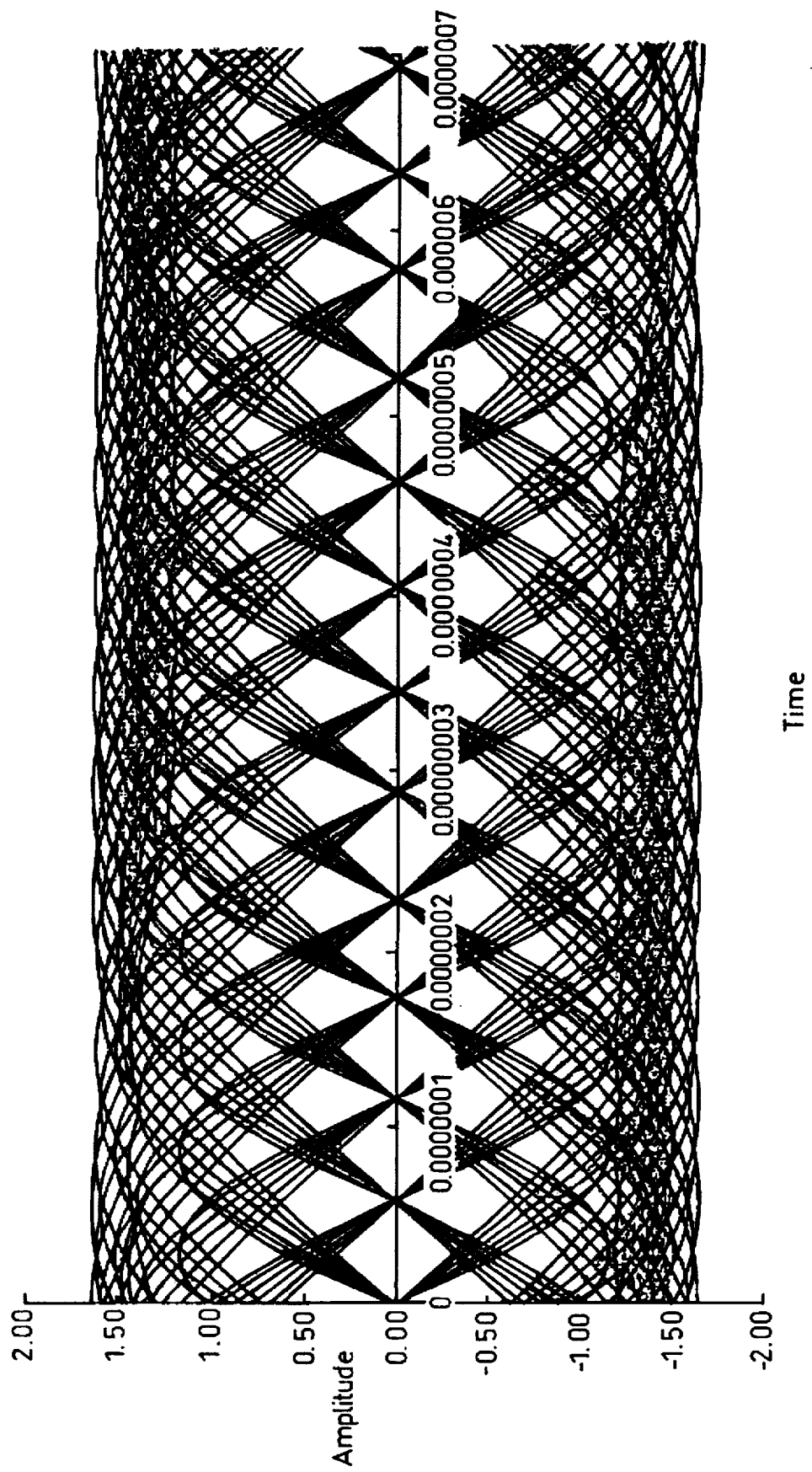
FIG. 16 is a diagram showing the waveform of an RF signal boosted with the frequency of 3 T used as a central frequency for boosting.

FIG. 16 shows an RF signal waveform which is produced by boosting an RF signal waveform shown in FIG. 15 at a central frequency of 3 T. As shown in FIG. 16, when the RF signal waveform is boosted at a central frequency of 3 T, the amplitude of the signal having a frequency of 3 T becomes the greatest. However, as described above with reference to FIG. 14B, the boosting of the third and fifth harmonics is considerably smaller than the boosting of the signal having a frequency of 3 T. Accordingly, the gradient of each of the RF signal waveforms containing the third and fifth harmonics becomes smaller, with the result that the eye pattern is not widened, as can readily be understood from FIG. 16.

Figure 17:
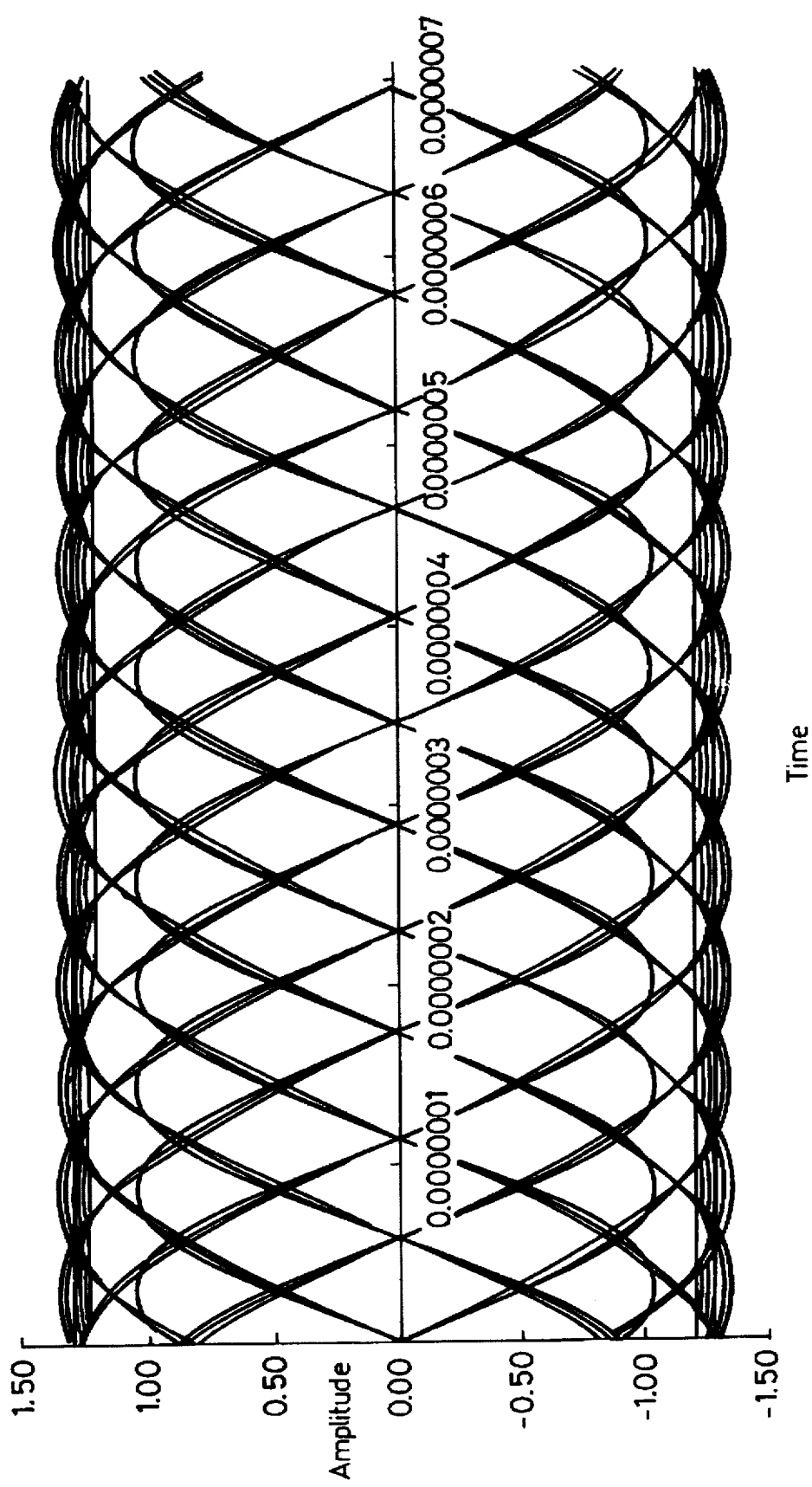
FIG. 17 is a diagram showing the waveform of an RF signal boosted with the frequency of 1.5 T used as a central frequency for boosting.

FIG. 17 shows an RF signal waveform which is produced by boosting an RF signal waveform shown in FIG. 15 at a central frequency of 1.5 T. As shown in FIG. 17, when the RF signal waveform is boosted at a central frequency of 1.5 T, harmonic components of the RF signal which has been attenuated by the MTF are recovered, and the gradients of the respective waveforms become larger, with the result that the eye pattern is widened, as can readily be understood from FIG. 16 and more clearly be seen from a comparison between FIGS. 15 and 16. Consequently, the eye pattern characteristics can be improved efficiently by using the frequency of 1.5 T as a central frequency for boosting.

A specific example will be described below with reference to FIG. 18. FIG. 18 shows the numbers of errors produced per block when three different types of optical disks are played back by the optical disk system shown in FIG. 7. Errors produced per block are counted by an error counter which is connected to the digital signal processor 12 shown in FIG. 7 when it effects an error-correcting process on the output signal from the equalizer 23.

The term "standard quality" and the term "quality lower than standard quality" used herein have the same definition as described above with reference to FIG. 6.

As shown in FIG. 18, the number of errors per block which are generated when a "CD-ROM of standard quality" is played back is in the range from 0 to 11 at a normal speed, in the range from 0 to 17 at a double speed, and in the range from 1 to 17 at a fourfold speed. The number of errors per block which are generated when a "CD-R" is played back is in the range from 5 to 13 at a normal speed, in the range from 6 to 20 at a double speed, and in the range from 13 to 23 at a fourfold speed. The number of errors per block which are generated when a "CD-ROM of quality lower than standard quality" is played back is in the range from 31 to 74 at a normal speed, in the range from 29 to 71 at a double speed, and in the range from 46 to 90 at a fourfold speed.

As can be understood from the above numerical values, the numbers of errors per block which are generated when all the optical disks are played back by the optical disk system shown in FIG. 7 are much smaller than those generated when the optical disks are played back by the conventional optical disk system. Particularly, the number of errors per block which are generated when a CD-ROM of quality lower than standard quality is played back is 1/7.17 to 1/4.16 times (at a normal speed) and 1/10.9 to 1/5.9 times (at a double speed) the number of errors per block which are generated when it is played back by the conventional optical disk system. Therefore, the number of produced errors that cannot be corrected is greatly reduced. Accordingly, irrespective of the type of the reproduced data, the quality of the reproduced data as information transfer accuracy is much greater than the quality of the data reproduced by the conventional optical disk system. For these reasons, normal products available in the market as CD-ROMs of quality lower than standard quality can be played back, without any problems, by the optical disk apparatus according to the present invention.

The number of errors per block which are generated when disks are played back at a fourfold speed cannot be compared with any existing data because no comparable data are available from the conventional optical disk system. However, since the numbers of errors produced when disks are played back at normal and double speeds by the optical disk apparatus according to the present invention are greatly reduced, it can readily be understood that the number of errors per block which are generated when disks are played back at a fourfold speed is also greatly reduced.

With the arrangement of the present invention, as described above, an RF signal is reproduced by an optical pickup from an optical recording medium on which data modulated by a modulation process with a prescribed shortest data length are recorded, and a frequency component of the RF signal, which has a frequency that is about twice the frequency of the RF signal reproduced from the recorded data with the shortest data length, is boosted by a cosine equalizer. A recorded data generating means then generates the recorded data from an output signal from the cosine equalizer. Consequently, the positive-going edges at all periodic cycles are aligned, and are of steep gradients. As a result, the reproduced signal is subject to minimum jitter.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An optical disk apparatus comprising:
    an optical pickup for reproducing an RF signal from an optical recording medium on which modulated data generated by modulating information data by a modulation process with a prescribed shortest data length are recorded;
    a cosine equalizer having frequency characteristics including a central boosting frequency which is about twice the frequency of the RF signal reproduced from the recorded data with the shortest data length, for thereby equalizing a waveform of the RF signal; and
    modulated data generating means connected to said cosine equalizer for generating the modulated data from said RF signal.

2. An optical disk apparatus according to claim 1, further comprising:
    switching means for switching the central boosting frequency of said cosine equalizer based on the frequency of the RF signal which varies depending on a speed of movement of said optical pickup with respect to said optical recording medium along the direction of a length of a track on the recording medium when the RF signal is reproduced from said optical recording medium by said optical pickup.

3. An optical disk apparatus according to claim 2, further comprising:
    a low-pass filter for being supplied with the RF signal outputted from said cosine equalizer;

and wherein said switching means switch a cutoff frequency of said low-pass filter based on the frequency of the RF signal.

4. An optical disk apparatus according to claim 3, wherein said low-pass filter comprises a Bessel-function low-pass filter.

5. An optical disk apparatus according to claim 2, wherein said speed of movement of said optical pickup with respect to said optical recording medium is established based on a control signal given from a host computer.

6. An optical disk apparatus according to claim 1, wherein said optical recording medium comprises an optical disk.

7. An optical disk apparatus according to claim 1, wherein the boosting frequency is set to 6 MHZ.

* * * * *